United States Patent

Suzuki et al.

[11] Patent Number: 6,050,631
[45] Date of Patent: Apr. 18, 2000

[54] IMPACT ENERGY ABSORBING STRUCTURE FOR VEHICLE CABIN

[75] Inventors: Naoyuki Suzuki; Katsutoshi Ishikawa; Ryoji Nakahama; Hajime Tsuchihara; Ryosuke Yamamoto; Ikumasa Moriyasu, all of Tokyo, Japan

[73] Assignee: Mitsubishi Jidosha Kogyo Kabushiki Kaisha, Tokyo, Japan

[21] Appl. No.: 08/793,537

[22] PCT Filed: Aug. 24, 1995

[86] PCT No.: PCT/JP95/01678

§ 371 Date: May 30, 1997

§ 102(e) Date: May 30, 1997

[87] PCT Pub. No.: WO96/05984

PCT Pub. Date: Feb. 29, 1996

[30] Foreign Application Priority Data

Aug. 25, 1994 [JP] Japan .................................. 6-200817
Jul. 14, 1995 [JP] Japan .................................. 7-179213
Jul. 14, 1995 [JP] Japan .................................. 7-179215

[51] Int. Cl.[7] .................................................. B62D 25/04
[52] U.S. Cl. ........................ 296/189; 296/39.1; 280/751
[58] Field of Search .................................. 296/189, 39.1, 296/188, 203, 146.6, 146.7; 280/748, 751, 752

[56] References Cited

U.S. PATENT DOCUMENTS

| 3,779,595 | 12/1973 | Suzuki et al. .................... 296/189 X |
| 5,163,730 | 11/1992 | Welch .................................. 296/189 |
| 5,544,933 | 8/1996 | Shahab et al. ..................... 296/189 |
| 5,641,195 | 6/1997 | Patel et al. ......................... 296/189 |

FOREIGN PATENT DOCUMENTS

| 0676315A1 | 10/1995 | European Pat. Off. . |
| 4015375A1 | 11/1991 | Germany . |
| 50-25690B | 8/1975 | Japan . |
| 52-36335Y | 8/1977 | Japan . |
| 63-143507 | 11/1988 | Japan . |
| 2231246A | 9/1990 | Japan . |
| 325349 U | 3/1991 | Japan . |
| 337040 U | 4/1991 | Japan . |
| 368149 U | 7/1991 | Japan . |
| 4-8989 | 1/1992 | Japan . |
| 442450 U | 4/1992 | Japan . |
| 4114853 U | 10/1992 | Japan . |
| 69912 Y | 3/1994 | Japan . |
| 6247199A | 9/1994 | Japan . |
| 72029 | 1/1995 | Japan . |
| 752735A | 2/1995 | Japan . |
| 7117596A | 5/1995 | Japan . |
| 7223495A | 8/1995 | Japan . |
| 7-257175 | 10/1995 | Japan . |
| 7285394A | 10/1995 | Japan . |
| 9702609Y | 3/1997 | Rep. of Korea . |
| 1053360 | 12/1966 | United Kingdom . |

*Primary Examiner*—Joseph D. Pape

[57] ABSTRACT

This invention relates to an impact energy absorbing structure for a cabin of an automotive vehicle. The impact energy absorbing structure is provided with a trim member (10) covering an inboard side of a structural member which constitutes the cabin of the automotive vehicle. An impact absorbing member is interposed between the inboard side of the structural member and the trim member (10), so that impact energy directed from a surface of the trim member (10) toward the structural member can be absorbed. When an occupant of the cabin is about to hit the structural member, impact energy is damped so that the occupant can be protected. The structural member includes a pillar (1) or the like, which constitutes the cabin of the automotive vehicle. The trim member (10) is arranged to cover an inboard side of the pillar (1) or the like. Resin-made ribs (11) or the like can be mentioned as the impact absorbing member. It is possible to design the structure so that impact energy directed from the surface of the trim member (10) toward the pillar (1) or the like can be absorbed through deformation or destruction of these resin-made ribs (11).

17 Claims, 17 Drawing Sheets

(CROSS-SECTION OF TRIM)

(BACK SIDE OF TRIM)

(BACK SIDE OF TRIM)

IMPACT ENERGY ABSORBING STRUCTURE FOR VEHICLE CABIN

TECHNICAL FIELD

This invention relates to an impact energy absorbing structure for a cabin of an automotive vehicle, which is suitable for use in absorbing impact energy of an occupant of the cabin against a pillar portion in the event of a collision or the like of the vehicle so that the occupant can be protected.

BACKGROUND ART

Keeping in step with the maturation of the motorized society, there has been an ever-increasing demand for safety measures for occupants in recent years.

Especially as measures for protecting occupants in the event of a collision of an automotive vehicle, a variety of techniques have been developed.

For example, as a measure for protecting a cabin upon collision, front and rear impact absorbing structures of a vehicle body, that permits absorption of impact energy while the vehicle body itself is undergoing collapse, have found wide-spread utility.

Also, as measures for directly protecting the body of an occupant in the event of a collision, developments of air bags and the like are now under way in addition to head rests and seat belts.

Described specifically, as a form of collision, an automotive vehicle may be struck from the rear. In the event of a collision from the rear as mentioned above, an occupant is subjected to strong rearward force because of inertia force or the like. In this event, a head rest, together with a seat back, support the back and head of the occupant so that the occupant is prevented from hitting an object located rearwards while being supported by the seat back and head rest.

In the case of a frontal collision, for example, an occupant is subjected to strong forward force due to inertia force or the like. Here, a seat belt prevents forward movement of the occupant so that the occupant can avoid hitting an object located frontwards. When the occupant is subjected to extremely strong forward force, forward impact energy of the occupant is absorbed in a cushioned manner by an air bag so that the occupant can avoid hitting a steering wheel, dash panel, wind shield or the like which is located frontwards.

Among forms of collisions of automotive vehicles, a representative one is a collision from the front or the rear. As a result of further research on the forms of collisions, it has been revealed that the form in which an automotive vehicle is struck from the side is not rare. Measures which have been developed against such a collision from the side include measures to protect a cabin through enhancement of the strength of a door, for example, by adding a reinforcement to a door panel.

It is also thought that in the event of a collision of an automotive vehicle, an occupant may be subjected to such force as causing him or her to hit a side wall of the cabin under inertia force or the like acting on him or her.

Namely, when force is applied to an occupant in a longitudinal direction of a vehicle body in the event of a collision, the occupant can be protected from hitting an object located frontwards or rearwards within the cabin by a seat back, a head rest, a seat belt, an air bag and/or the like as mentioned above. There is, however, a potential danger that the occupant may hit a side wall of the cabin when the occupant is subjected to such force as being directed toward the side wall of the cabin.

It is therefore desired to prevent the occupant from hitting the side wall of the cabin especially at a part where the side wall has high strength and rigidity.

A typical example of such a high strength and rigidity part in the side wall of the cabin is a pillar.

For example, FIG. 20 is a view showing, by way of examples, a test area and a range of directions of impacts in an impact absorption test which determines whether or not an impact-absorbing structure required for a pillar part to protect an occupant meets a standard.

The drawing illustrates the testing method upon a center pillar. In a prescribed height range of a pillar inner 2 arranged on an inboard side of the pillar (namely, the center pillar), an impact absorption test is conducted in the area and directions as indicated by hatching. Namely, over an entire area of the pillar 1 ranging from a front-side flange portion 4 to a rear-side flange portion 5 where the pillar inner 2 is joined with a pillar outer 3, predetermined impact loads are applied in the corresponding directions by an object imitating an occupant to test whether or not the absorption of the impacts is sufficiently performed.

When the pillar portion is provided, on an inboard side thereof, with an impact absorbing structure, the impact absorbing structure is determined to be free of problems insofar as, upon application of predetermined impact loads from the prescribed directions in such a range, such impacts can be absorbed before the above-described object directly reaches the pillar inner 2.

Incidentally, numerals 6 and 7 in FIG. 20 indicate flange trims fitted on the flange portions 4,5, respectively.

Typical examples of application manners of such impact loads include an impact test in which an impact is applied toward a central portion of a front wall of the pillar inner 2 from a direction a, an impact test in which impacts are applied toward a side portion of the pillar inner 2 from directions b,b' and an impact test in which impacts are applied toward the flange portions 4,5 on an edge portion of the pillar inner 2 from directions c,c'.

It is in view of the directions of all possible collisions of an occupant against the pillar 1 that the impact absorbing tests from the respective directions are conducted. Conversely speaking, it is desired to provide an impact absorbing structure which, irrespective of the colliding direction of the occupant against the pillar 1, can protect the occupant by surely absorbing impact energy from such various directions.

In general, there are many automotive vehicles with pillar inners 2 covered with trims. Such trims are, however, intended merely to improve the cabin appearance and/or to provide better touch feeling when occupants touch pillar portions. As such conventional trims, those having such a structure as shown, for example, in FIG. 21 are common. Namely, as illustrated in FIG. 21, no particular member is arranged between the pillar inner 2 and a trim 8 to permit absorption of an impact as intended. Further, a gap d between the pillar inner 2 and the trim 8 is small so that the pillar inner 2 is caused to immediately reach the bottom upon application of an impact against the trim 8.

Incidentally, Japanese Utility Model Application Laid-Open (Kokai) No. HEI 3-37040 discloses a mounting structure for a pillar garnish. This technique, however, is intended to permit an adjustment of a mounted position of the pillar garnish and fails to take into consideration impacts which may be applied as described above. This technique therefore cannot overcome the above-mentioned problem.

Further, Japanese Utility Model Application Laid-Open (Kokai) No. HEI 3-68149 discloses a mounting structure for a pillar trim. This technique is intended to protect a pillar trim from deformation. Like the technique mentioned above, nothing is, however, taken into consideration against impacts which may be applied to the pillar. This technique cannot overcome the above-mentioned problem either.

With the foregoing problem in view, it is an object of the present invention that, even when the occupant is caused to hit an inboard side of a structural member such as a pillar, the occupant be protected by absorbing impact energy produced at the time of this hitting. It is another object of the present invention to surely retain the width of an opening between structural members such as pillars and also a good outward appearance of a vehicle by avoiding widening of the structural members which would otherwise occur as a result of the provision of the protection.

DISCLOSURE OF THE INVENTION

This invention is characterized in that a trim member covering an inboard side of a pillar constituting a cabin of an automotive vehicle is arranged; impact absorbing ribs capable of absorbing impact energy directed from a surface of the trim member toward the pillar are integrally formed with the trim member by a resin material between the inboard side of the pillar and the trim member; a side edge portion of the trim member being formed in a curved shape so that the side edge portion covers a corresponding flange portion, formed at an edge portion of the pillar, on a side inboard relative to the flange portion; and the impact absorbing ribs being also formed a part of the side edge portion, said part facing the flange portion.

Owing to such features, the impact energy directed toward the pillar can be absorbed through deformation and in some instances, destruction or the like of the impact absorbing ribs so that, when the occupant in the cabin is about to hit the pillar, the impact energy can be damped to protect the occupant.

The impact absorbing ribs and the trim member are integrally formed with the resin material. This can facilitate the absorption of the impact energy, and can also reduce the number of parts and/or components. It is also possible to produce, with extreme ease, the impact absorbing ribs and the trim member by molding or the like, thereby bringing about cost-reducing effects.

In particular, by the formation of the side edge portion of the trim member in the curved shape so that the side edge portion covers the corresponding flange portion formed at the edge portion of the pillar, an impact against the flange portion of the pillar can be damped, thereby enhancing the occupant protecting effects. It can also provide the flange portion with an improved outward appearance.

Further, the impact absorbing ribs are also formed at the part of the side edge portion, the part facing the flange portion. By deformation, and in some instances, destruction or the like of these impact absorbing ribs, impact energy such as that directed to the flange portion of the pillar can be absorbed. When the occupant in the cabin is about to hit the flange portion which is a particularly high-rigidity portion of the pillar, the impact energy can be damped to protect the occupant. The occupant protecting effects can therefore be improved substantially.

Further, the impact absorbing ribs may be formed into a honeycomb structure extending in a direction substantially perpendicular to the trim member. This makes it possible to efficiently perform the absorption of the impact energy and hence to enhance the occupant protecting effects without increases in the thickness of the ribs and the size of the trim member.

In addition, a cushioning material may be interposed between the trim member and the pillar. This makes it possible to gradually achieve the absorption of the impact energy, thereby enhancing the occupant protecting effects.

The honeycomb structure can be formed by connecting plural vertical ribs, which extend in a longitudinal direction of the pillar, with plural lateral ribs which extend in a lateral direction of the pillar. This provides rib configurations which are simple and are readily moldable. moreover, the rib configurations can efficiently perform the absorption of the impact energy, thereby enhancing the occupant protecting effects.

In this case, the trim member may be provided inside the side edge portion with plural edge ribs which are parallel with the lateral ribs; and the edge ribs may be connected with a closest vertical rib out of the plural vertical ribs. This makes it possible to absorb the impact energy in a wide area, including the flange portion and the like of the pillar, so that the occupant protecting effects can be enhanced.

Further, the lateral ribs and the pillar may be spaced from each other by a gap. This allows the lateral ribs to readily undergo bending deformation when subjected to an impact from a direction forward or rearward relative to the pillar. The impact energy can therefore be absorbed more efficiently through the lateral ribs, thereby making it possible to enhance the occupant protecting effects.

The present invention is also characterized in that a trim member covering an inboard side of a pillar constituting a cabin of an automotive vehicle is arranged; an impact absorbing member capable of absorbing impact energy directed from a surface of the trim member toward the pillar is arranged between the inboard side of the pillar and the trim member; a trim member, provided with a front portion covering an inboard front portion of the pillar and a side edge portion which covers a corresponding inboard edge portion of the pillar and covering the inboard side of the pillar, is arranged; the impact absorbing member being arranged inside the side edge portion of the trim member so that the impact absorbing member can absorb impact energy applied in a direction outboard and obliquely sideway relative to the pillar; and upon absorption of the impact energy, the impact absorbing member guides the side edge portion of the trim member to a position where the side edge portion is kept out of contact with a side edge of the pillar.

Owing to such features, an absorbing stroke, which is required to absorb impact energy directed from the side edge portion of the trim member toward the pillar, can be surely retained without increasing the width of the trim member and also the width of a pillar portion. This has the advantageous effects that, while permitting protection of the occupant through absorption of outboard impact energy against the pillar, widening of the structural member, which would otherwise take place to provide such protection, can be suppressed to surely retain the width of an opening in a vicinity the pillar portion and also to assure maintenance of a good outward appearance of the vehicle.

As the impact absorbing member, impact absorbing ribs may be arranged inside the front portion so that the impact absorbing ribs can absorb impact energy applied in a direction outboard and sideway relative to the pillar. This makes it possible to sufficiently absorb an impact against the pillar from an inboard front direction and hence to improve the occupant protection performance.

The impact absorbing ribs and the trim member may be integrally formed with a resin material. This can facilitate the absorption of the impact energy, and can also reduce the number of parts and/or components. It is also possible to produce, with extreme ease, the impact absorbing ribs and the trim member by molding or the like, thereby bringing about cost-reducing effects.

The impact absorbing member may be provided with a flexible member, which can undergo deformation in a predetermined deformation mode upon input of impact energy. This makes it possible to surely guide the side edge portion of the trim member to a position where the side edge portion is kept out of contact with a side edge of the pillar. It is therefore possible to effectively absorb impact energy against the pillar while surely retaining the width of an opening in a vicinity of the pillar and also assuring maintenance of a good outward appearance of the vehicle.

The impact absorbing member may be provided with a sheet metal member with at least one bendable point formed in advance so that the sheet metal member can undergo deformation in the predetermined deformation mode. This makes it possible to surely guide, at low cost, the side edge portion of the trim member to a position where the side edge portion is kept out of contact with a side edge of the pillar. The impact absorbing member may be provided with a flexible member, which can undergo deformation in a predetermined deformation mode upon input of impact energy. This makes it possible to surely guide the side edge portion of the trim member to a position where the side edge portion is kept out of contact with a side edge of the pillar. It is therefore possible to effectively absorb impact energy against the pillar while surely retaining the width of an opening in a vicinity of the pillar and also assuring maintenance of a good outward appearance of the vehicle.

The impact absorbing member may be provided with a trim-member-mounting bracket connected at one end thereof with the pillar and at an opposite end thereof with the side edge portion of the trim member. This is effective in reducing the number of parts and/or components.

The pillar may be provided, at the side edge thereof, with a flange portion; and the side edge portion of the trim member may be arranged so that the side edge portion covers the flange portion on a side inboard relative to the flange portion with a distance as much as an impact-energy-absorbing stroke. This makes it possible to surely absorb the impact energy and also to improve an outward appearance of the cabin around the pillar portion.

The flange portion may be provided with a flange trim, and the flange trim may be provided with an extension formed thereon so that the extension is kept in contact with an edge of the side edge portion of the trim member. This makes it possible to improve the outward appearance of the cabin around the pillar portion.

This invention is also characterized by the provision of: a structural member formed of an inner member and an outer member, which are joined together at flange portions provided on side edges of the inner and outer members, and constituting a cabin of an automotive vehicle; a trim member provided with a front portion facing an inboard front portion of the structural member and also with a side edge portion facing a corresponding inboard side edge portion of the structural member so that the trim member covers the inboard side of the structural member; a side edge wall portion formed on the inboard edge portion at a position adjacent to a base portion of the flange on a side of the inner member so that the side edge wall portion extends toward the side edge portion of the trim member; and edge impact absorbing ribs arranged between the side edge wall portion and the side edge portion of the trim member so that impact energy applied at a small angle in a direction from a surface of the side edge portion of the trim member toward a vicinity of the flange portion can be absorbed.

Owing to such features, the absorption stroke, which is required to absorb impact energy directed from the side edge portion of the trim member toward the structural member, can be surely retained without increasing the width of the trim member and also the width of the structural member. This has the advantageous effects that, while permitting protection of the occupant through the absorption of outboard impact energy against the structural member, widening of the structural member which would otherwise take place to provide such protection can be suppressed to surely retain the width of an opening in a vicinity of the structural member and also to assure maintenance of a good outward appearance of the vehicle.

The structural member may be constructed of a pillar, which is arranged in the automotive vehicle and which is formed of an inner member and an outer member joined together at flange portions provided on side edges of the inner and outer members; and the trim member may be provided with a front portion facing an inboard front portion of the pillar and also with a side edge portion facing a corresponding inboard side edge portion of the pillar so that the trim member covers an inboard side of the pillar.

By these, the absorption stroke, which is required to absorb impact energy directed from the side edge portion of the trim member toward the pillar, can be surely retained without increasing the width of the trim member and also the width of the pillar as a structural member, thereby bringing about the advantageous effects that, while permitting protection of the occupant through the absorption of outboard impact energy against the pillar, widening of the pillar portion, which would otherwise take place to provide such protection, can be suppressed to surely retain the width of an opening in a vicinity of the pillar and also to assure maintenance of a good outward appearance of the vehicle.

The side edge wall portion may be formed on the inner member. This makes it possible to surely achieve absorption of impact energy and further to efficiently obtain an energy absorption stroke.

The side edge wall portion may be formed on a seat belt member mounted on the inner member. This makes it possible to surely perform absorption of impact energy and also to efficiently obtain an energy absorption stroke while making use of the seat belt member.

The edge impact absorbing ribs and the trim member may be integrally formed with a resin material. This has the advantages that the absorption of the impact energy is facilitated and the number of parts and/or components can be reduced. It is also possible to produce, with extreme ease, the impact absorbing ribs and the trim member by molding or the like, thereby bringing about cost-reducing effects.

Front impact absorbing ribs may be arranged between the inboard front portion of the pillar and the front portion of the trim member so that impact energy applied in an outboard sideway direction to the trim member can be absorbed. This also facilitates the absorption of impact energy applied to the trim member in the outboard sideway direction.

The edge impact absorbing ribs and the front impact absorbing ribs may be formed in a honeycomb structure extending in a direction substantially perpendicular to the trim member. Without increases in the thickness of the ribs and the size of the trim member, this makes it possible to effectively perform absorption of impact energy and hence to enhance the occupant protecting effect.

The front impact absorbing ribs may be formed by connecting plural vertical ribs, which extend in a longitudinal direction of the pillar, with plural lateral ribs, which extend in a lateral direction of the pillar; and the front impact absorbing ribs themselves may be formed into the honeycomb structure. Without increases in the thickness of the ribs and the size of the trim member, this makes it possible to effectively perform absorption of impact energy and hence to enhance the occupant protecting effect.

The trim member may be constructed so that a free end of a side edge of the trim member is located inboard the flange portion formed on an edge of the pillar. This can surely avoid a limitation to deformation of the trim member by the side edge portion of the pillar so that the impact energy absorption stroke of the trim member can be surely increased.

BRIEF DESCRIPTION OF THE DRAWINGS

FIGS. 1(A) and 1(B) are both views showing a trim having an impact energy absorbing structure according to a first embodiment of the present invention for a cabin, in which FIG. 1(A) is a cross-sectional view taken in the direction of arrows IA—IA of FIG. 1(B) and FIG. 1(B) is a view illustrating a back side of the trim.

BEST MODE FOR CARRYING OUT THE INVENTION

With reference to the drawings, a description will hereinafter be made about certain preferred embodiments of the present invention.

Firstly, the first embodiment of the present invention will be described with reference to FIG. 1 to FIG. 3.

Figure 1A:
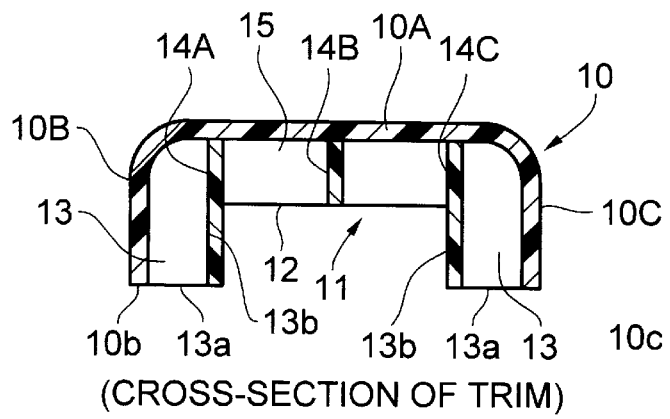
Figure 1B:
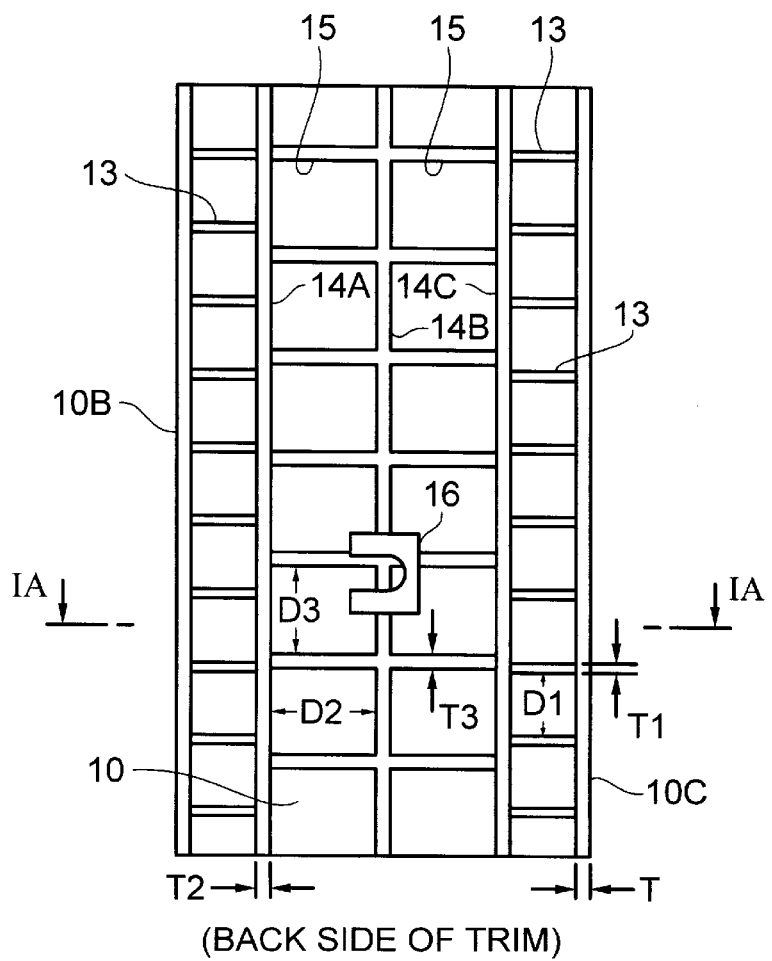
Figure 2:
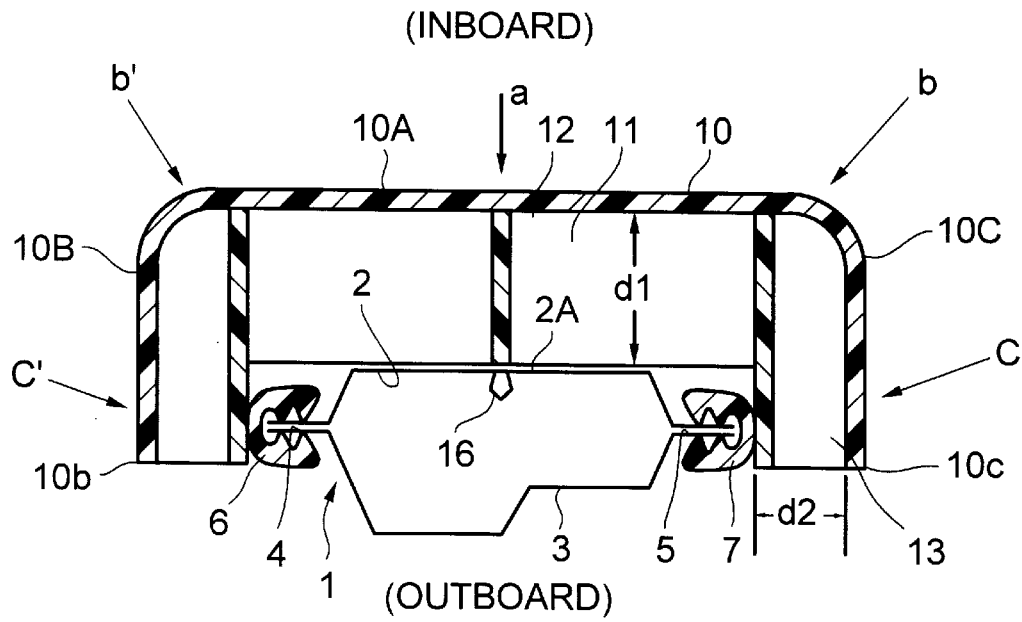
FIG. 2 is a cross-soctional view illustrating a mounted state of the trim, which has the impact energy absorbing structure according to the first embodiment of the present invention for the cabin, on a vehicle body (pillar).
Figure 3:
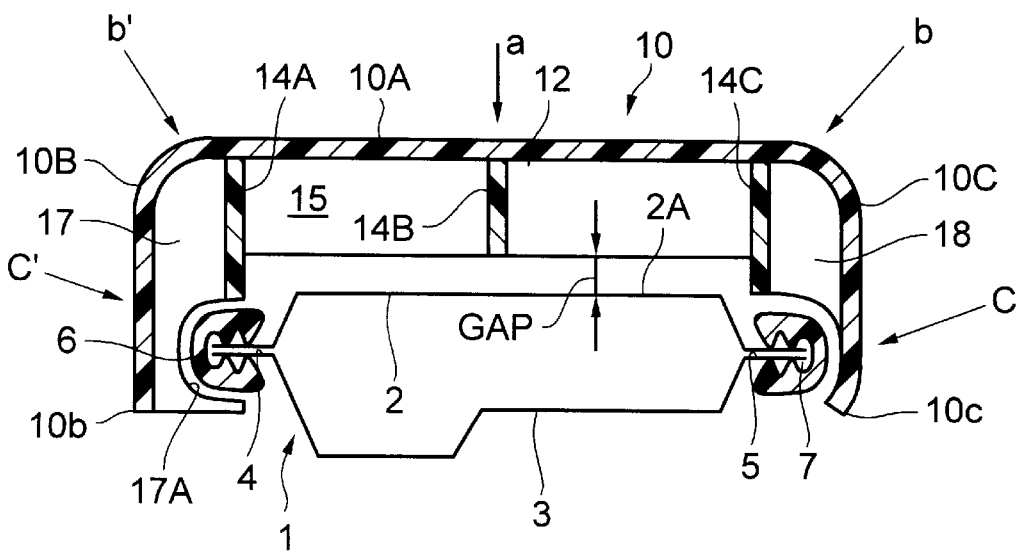
FIG. 3 is a cross-sectional view of a pillar portion, showing effects of the impact energy absorbing structure according to the first embodiment of the present invention for the cabin.

In FIGS. 1–3 the impact energy absorbing structure of this embodiment, mounted on a center pillar, which is a structural member of a cabin of an automotive vehicle, is illustrated.

Namely, as is shown in FIG. 2, a trim (trim member) 10 is mounted to cover an inboard side 2A of an inner pillar 2 of a pillar (center pillar) 1. Inside the trim 10, impact absorbing ribs 11 are arranged so that upon mounting the trim 10 on the inner pillar 2, the impact absorbing ribs 11 are interposed between the inboard side 2A of the pillar inner 2 and the trim 10. Incidentally, numeral 3 indicates an pillar outer.

In this embodiment, the trim 10 and the impact absorbing ribs 11 are both made of a resin. In particular, the impact absorbing ribs 11 and the trim 10 have been formed by monolithic molding.

As is illustrated in FIG. 2, the trim 10 is provided with a central planar portion (or a front portion) 10A facing the inboard side 2A, which extends up and down centrally relative to the direction of the width of the pillar inner 2, and also with curved side edge portions (side edge portions) 10B,10C formed in configurations smoothly curved from opposite side edges of the central planar portion 10A so that the side edge portions cover the flange portions 4,5 formed at edge portions of the pillar inner 2. End edges 10b,10c of the curved side edge portions 10B,10C extend beyond the positions of the flange portions 4,5 to positions located somewhat outside the vehicle body.

The impact absorbing ribs 11 are formed on the back side of the trim 10, as shown in FIG. 1(A) and FIG. 1(B), and include front ribs (front impact absorbing ribs) 12 formed on a back side of the central planar portion 10A of the trim 10 and also edge ribs (edge impact absorbing ribs) 13 formed on back sides of the curved side edge portions 10B,10C of the trim 10.

The front ribs 12 have been constructed by connecting plural vertical ribs 14A,14B,14C, which are arranged at predetermined intervals to extend in a longitudinal direction of the pillar 1, with plural lateral ribs 15, which are arranged at predetermined intervals to extend in a lateral direction of the pillar 1. By these vertical ribs 14A,14B,14C and the plural lateral ribs 15, the front ribs are formed into a honeycomb structure with rectangular cells arranged therein.

The centrally-located rib 14B, among the vertical ribs 14A,14B,14C, and the plural lateral ribs 15 are set in length so that their free ends are brought into contact with or close to the inboard side 2A of the pillar inner 2 when the trim 10 is mounted on the pillar inner 2. On the other hand, the vertical ribs 14A,14C, which are located on the sides of the curved side edge portions 10B,10C, extend to the positions of the end edges 10b,10c of the curved side edge portions 10B,10C of the trim 10 so that the vertical ribs cover end faces of the flange portions 4,5 of the pillar 1, respectively. The left and right, vertical ribs 14A,14C are therefore formed to hold therebetween the flange portions 4,5 on which the flange trims 6,7 are mounted.

The plural edge ribs 13 are arranged extending at predetermined intervals in the direction of the width of the pillar 1 so that the edge ribs 13 lie in parallel with the lateral ribs 15. Their side edges 13a are formed extending to the end edges 10b,10c of the curved side edge portions 10B,10C of the trim 10. Further, their front end portions 13b are connected to the vertical ribs 14A,14C, whereby a sort of honeycomb structure is formed with substantially square cells arranged therein. Because relatively large rigidity is required for the curved side edge portions 10B,10C of the trim 10 in order to absorb impacts, the edge ribs 13 are arranged at a higher density than the lateral ribs 15 in this embodiment.

To provide the trim 10 itself and the respective ribs 13,14A–14C,15 with predetermined rigidities, their thicknesses T,T1,T2,T3 and intervals D1,D2,D3 are set at predetermined values.

When an impact load of a predetermined magnitude is applied from the surface of the trim 10, its impact energy is gradually absorbed while the individual ribs 13,14A–14C,15 undergo buckling and further destruction. At this time, an object, which is used to apply the impact load is reduced in speed and stopped while applying resisting force against the object.

If the resisting force applied to the object is excessively large at this time, sufficient damping cannot be achieved. It is therefore necessary to limit the rigidities of the individual ribs 13,14A–14C,15 so that their rigidities are prevented from becoming excessively high, namely, so that an effective damping action can be obtained. If the rigidities of the individual ribs 13,14A–14C,15 are too low conversely, a substantial distance is needed until the object is stopped. Accordingly, the rigidities of the individual ribs 13,14A–14C,15 should not be excessively low.

Distances d1,d2 between the trim 10 and the pillar inner 2 are also set to conform with the rigidities of the individual ribs 13,14A–14C,15 so that, when an impact load of a predetermined magnitude is applied from the surface of the trim 10, its impact energy can be fully absorbed through buckling and subsequent destruction of the individual ribs 13,14A–14C,15 before the trim 10 comes in contact with the side of the pillar inner 2.

Incidentally, the fixing of the trim 10 on the pillar inner 2 is effected by fittedly inserting mounting clips 16, which are attached to free end portions of the ribs 14A,15 on the back side of the trim 10, in fitted holes (not shown) formed on the side of the pillar inner 2 and then holding the flange portions 4,5 between the left and right, vertical ribs 14A and 14C.

The impact energy absorbing structure according to the first embodiment of the present invention for the cabin is constructed as described above. When an occupant is about to hit the pillar 1, the occupant is therefore protected by damping the resulting impact as will be described hereinafter.

As is shown in FIG. 2 by way of example, when an impact is applied to the central planar portion 10A of the trim 10 in the direction a, the vertical rib 14B and the numerous lateral ribs 15 primarily bear the impact and, while these ribs 14B,15 undergo buckling deformation and in some instances, destruction under the impact energy, the impact energy is absorbed before the central planar portion 10A of the trim 10 reaches the pillar inner 2. Hence, even when the occupant hits the central planar portion 10A of the trim 10 in the direction a, the impact can be damped to a certain level or less to protect the occupant.

When an impact is applied to a connecting part between the central planar portion 10A and the curved side edge portion 10B or 10C in the trim 10 in the direction b or b' as shown, for example, in FIG. 2, the edge ribs 13 and the vertical rib 14A or 14C primarily bear the impact and, while these ribs 13 and 14A or 14C undergo buckling deformation and in some instances, destruction under the impact energy, the impact energy is absorbed before the trim 10 reaches a corner portion of the pillar inner 2. Hence, even when the occupant hits the trim 10 in the direction b or b', the impact can be damped to a certain level or less to protect the occupant.

When an impact is applied to the curved side edge portion 10B or 10C in the direction c or c' as shown, for example, in FIG. 2, the edge ribs 13 and the vertical rib 14A or 14C also primarily bear the impact in this case and, while these ribs 13 and 14A or 14C undergo buckling deformation and in some instances, destruction under the impact energy, the impact energy is absorbed before the trim 10 reaches the flange portion 4 or 5 of the pillar 1. Hence, even when the occupant hits the trim 10 in the direction c or c', the impact can be damped to a certain level or less to protect the occupant.

A description will next be made about the second embodiment of the present invention. As is illustrated in FIG. 3, the impact energy absorbing structure of this embodiment is also for the center pillar. In this embodiment, a gap of a predetermined width is formed between free edges of front ribs 12 and the inboard side 2A of the pillar inner 2. Further, compared with the first embodiment, curved side edge portions 10B,10C of a trim 10 are closer to the flange portions 4,5 of the pillar 1, and their end edges 10b,10c are bent to embrace free ends of the flange portions 4,5.

In this embodiment, the end edge 10b of the curved front side edge portion 10B is somewhat separated from a free end of the flange portion 4 and the end edge 10c of the curved rear side edge portion 10C is closer to the free end of the flange portion. Further, front-side edge ribs 17 are each provided with an indentation 17A along the flange trim 6 so that the flange portion 4 is embraced. Rear-side edge portion ribs 18 are formed only inside the flange trim 7.

Free ends of the trim 10 are fixed by embracing the flange portions 4,5 by the curved side edge portions 10B,10C and the edge ribs 17,18 of the trim 10 as described above.

Of course, the front-side and rear-side edge ribs may be formed into the same shape by forming both of them into edge ribs 17 having indentations 17A or to form both of them into edge ribs 18 formed only inboard the flange trims 6,7.

The impact energy absorbing structure according to the second embodiment of the present invention for the cabin is constructed as described above. When an impact is applied to the trim 10 in a direction a, primarily a vertical rib 14B and numerous lateral ribs 15 therefore absorb the impact energy in substantially the same manner as in the first embodiment before a central planar portion 10A of the trim 10 reaches the pillar inner 2 while the vertical rib and lateral ribs undergo buckling deformation and in some instances, destruction under the impact energy.

Further, when an impact is applied to the trim 10 in a direction b or b' or in a direction c or c', primarily the edge ribs 13 and the vertical rib 14A or 14C absorb the impact energy in substantially the same manner as in the first embodiment while the edge ribs and vertical rib undergo buckling deformation and in some instances, destruction under the impact energy.

Moreover, since the gap is formed between the free edges of the front ribs 12 and the inboard side 2A of the pillar inner 2, the front ribs 12, especially the lateral ribs 15 can absorb an impact applied in the direction b or b' or in the direction c or c' as described above while they themselves undergo deformation. Even in the case of large impact energy, the front ribs 12 also cooperate with the gap so that the impact energy can be absorbed before the trim 10 reaches a corner portion of the pillar inner 2.

Even when the occupant hits the trim 10 in various directions, the impacts can also be damped to a certain level or less by the construction of the second embodiment as described above, thereby making it possible to protect the occupant.

This embodiment also has the advantage that the flange portions 4,5 are completely covered by the trim 10 to improve the outward appearance, because the curved side edge portions 10B,10C, the edges of the trim 10, are formed to embrace the flange portions 4,5.

Figure 4:
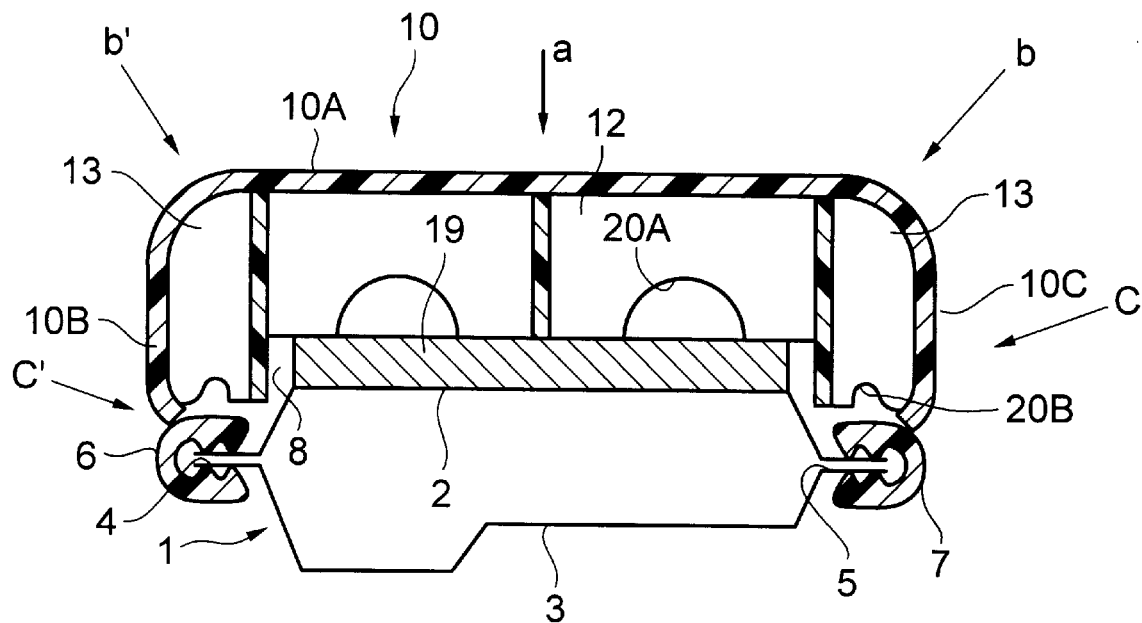
FIG. 4 is a cross-sectional view illustrating a mounted state of a trim, which has an impact energy absorbing structure according to a second embodiment of the present invention for the cabin, on the vehicle body (pillar).

Next, a description will be made of the third embodiment of the present invention. As is shown in FIG. 4, the impact energy absorbing structure of this embodiment is also for a center pillar. In this embodiment, the impact energy absorbing structure is intended to gradually absorb an impact in a direction a. A gap 8 of a predetermined width is formed between free edges of front ribs 12 and the inboard side 2A of the pillar inner 2, and a damping material (cushioning material) 19 such as a rubber pad is inserted in the gap 8.

Further, holes or indentations 20A,20B are formed in some or all of lateral ribs 15 and vertical ribs 14A–14C of the front ribs 12 and edge ribs 13 to adjust in a lowering direction of the rigidity against a load in the direction a.

In this embodiment, curved side edge portions 10B,10C of the trim 10 are shaped so that they do not embrace the free ends of the flange portions 4,5 of the pillar 1 but cover the flange portions 4,5 from the inboard side only.

The impact energy absorbing structure according to the third embodiment of the present invention for the cabin is constructed as described above. When an impact is applied to the trim 10 in the direction a, primarily a vertical rib 14B and numerous lateral ribs 15 therefore absorb the impact energy in substantially the same manner as in the first and second embodiments before a central planar portion 10A of the trim 10 reaches the pillar inner 2 while the vertical rib and lateral ribs undergo buckling deformation and in some instances, destruction under the impact energy.

In particular, the hole or indentations 20A,20B are formed in the individual ribs 12,13 and the damping material 19, such as a rubber pad is arranged between the free edges of the front ribs 12 and the pillar inner 2. Accordingly, an impact in the direction a can be damped into a small impact, a load in the direction a can be slowly damped, and the damping of an impact in the direction a can be surely performed, whereby the performance of occupant protection can be improved.

Moreover, primarily the edge ribs 13 and the vertical rib 14A or 14C can absorb an impact applied in the direction b or b' or in the direction c or c' in substantially the same manner as the first embodiment. Even in the case of large impact energy, the ribs 13,14A,14C and the front ribs 12 cooperate with each other so that the impact energy can be absorbed before the trim 10 reaches the corner portion of the pillar inner 2.

Especially owing to the formation of the holes or indentations 20A,20B, the rigidity against a load in the direction b or b' or a load in the direction c or c' is adjusted so that the absorption of impact energy can be more gradually performed.

Incidentally, as such rigidity adjusting means, certain desired ribs can be provided with thin-wall portions.

Figure 5:
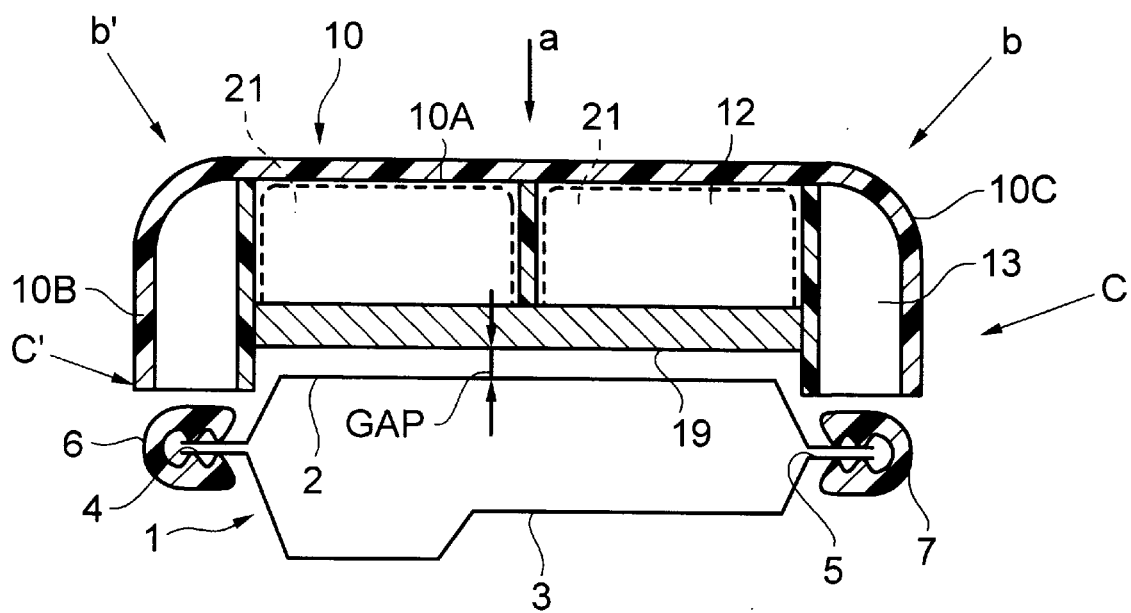
FIG. 5 is a cross-sectional view illustrating a mounted state of a trim, which has an impact energy absorbing structure according to a fourth embodiment of the present invention for the cabin, on the vehicle body (pillar)

A description will next be made of the fourth embodiment of the present invention. As is illustrated in FIG. 5, the impact energy absorbing structure of this embodiment is also for a center pillar. In this embodiment, from the viewpoint of protecting an occupant from rib pieces and/or fragments or the like of the trim 10 produced due to buckling damages of ribs 12,13, elastic members (cushioning materials) 21 made of a hard or soft rubber material or the like are inserted within desired ones of cells formed between the individual ribs 12 and 13.

A partial impact applied to the trim 10 is distributed to many ribs 12,13 through the elastic members 21, so that the impact energy can be absorbed through deformations of the ribs 12,13 and the elastic members 21.

Even when the ribs 12,13 are broken, exposure of fragments or the like of the ribs can be prevented owing to the existence of the elastic material 21.

Incidentally, as the structures of the ribs 12,13 themselves, the structures of the corresponding ribs in the structure of the third embodiment except for the omission of the holes or indentations 20A,20B and the formation of a gap 8 between the damping material 19 and the pillar inner 2 are used.

Since the impact energy absorbing structure according to the fourth embodiment of the present invention for the cabin is constructed as described above, application of an impact to the trim 10 causes deformation of the ribs 12,13 and the elastic member 21 so that the impact energy can be absorbed. It is therefore possible to protect an occupant by preventing influence of these fragments against the occupant.

Even when the ribs 12,13 are broken by an impact, exposure of fragments or the like of the ribs is prevented owing to the presence of the elastic members 21, thereby minimizing influence of the fragments to the occupant.

Figure 6:
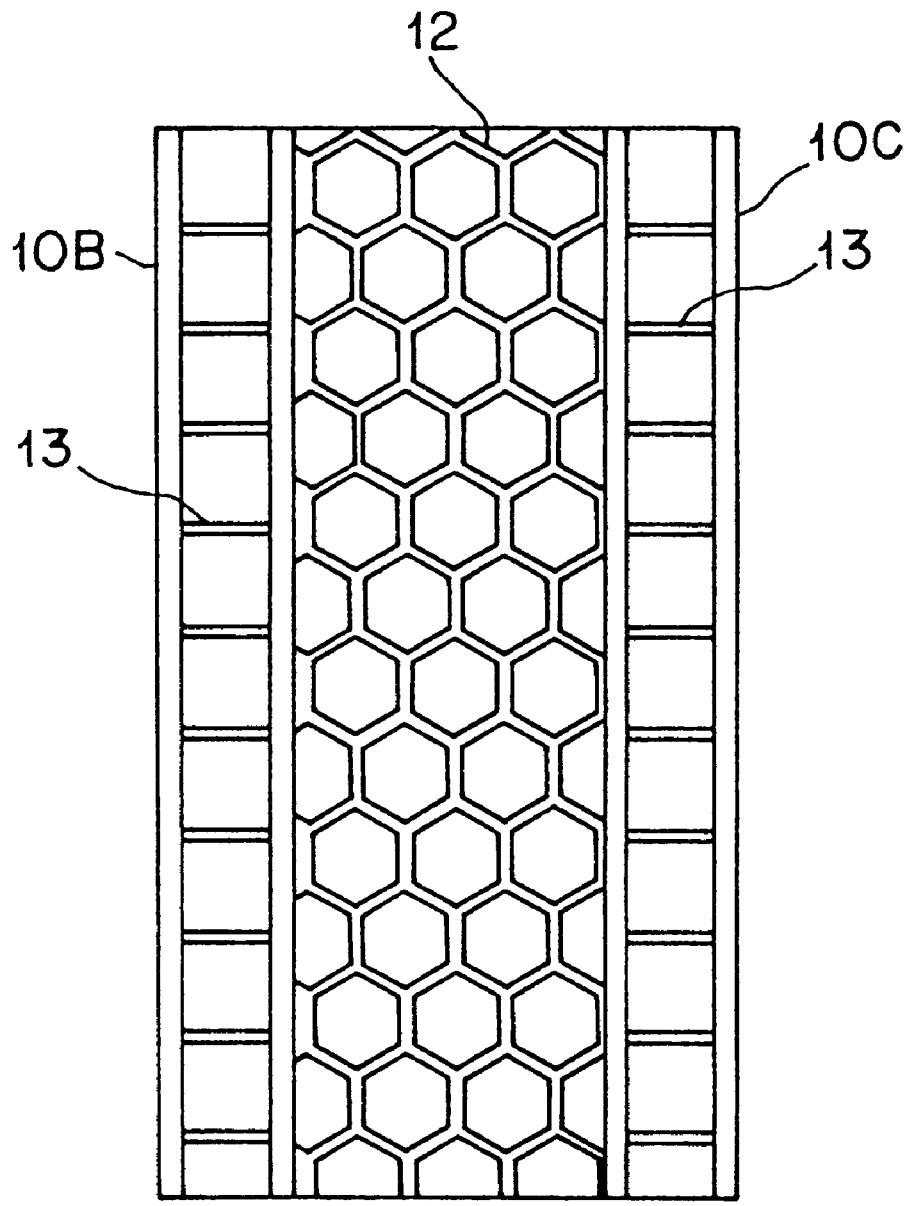
FIG. 6 is a view depicting a back side of a trim, showing a configurational modification of impact absorbing ribs in the first to fourth embodiments of the present invention.

In each of the above-described embodiments, the front rib 12 and edge ribs 13 are formed into the honeycomb structure composed of the arrays of rectangular cells. Honeycomb structures of various cell configurations are, however conceivable, including one obtained by forming some or all of the front rib 12 and the edge ribs 13 into a general honeycomb structure constructed of arrays of hexagonal cells as shown, or example, in FIG. 6.

It can also be contemplated to combine certain parts of the above-described individual embodiments. Namely, in the construction of the first embodiment, it can also be contemplated to form the end edges 10b,10c of the curved side edge portions 10B,10C of the trim 1 into a curved shape to embrace the end faces of he flanges 4,5 and then to form the edge ribs 13 correspondingly or to arrange a gap between the free end of the front rib 12 and the pillar inner 2.

In the constructions of the first embodiment and the second embodiment, it is contemplated to provide the ribs 12,13 with rigidity-adjusting portions such as holes or indentations similar to those of the third embodiment or thin-walled portions at desired positions or to interpose the damping material 19 between the free edges of the front ribs 12 and the pillar inner 2. In this case, a gap can be arranged between the pillar inner 2 and the damping material 19.

Further, in the constructions of the first to third embodiments, it is also contemplated to insert elastic materials 21 similar to those of the forth embodiment in desired ones of the cells between the ribs 12,13.

In each of the embodiments, the trim 10 and the impact absorbing ribs 11 are both made of a resin. In particular, the impact absorbing ribs 11 are integrally molded with the trim 10. It is, however contemplated to form the impact absorbing ribs 11 as discrete elements from the trim 10. In addition, the material is not limited to a resin material and use of another material such as rubber or paper is also contemplated.

In each of the above-mentioned embodiments, the absorption of impact energy must be completed before the trim 10 reaches the pillar inner 2. It is therefore necessary to leave a sufficient distance from the trim 10 to the pillar inner 2 (which also corresponds to the length of each rib), that is, to retain a sufficient energy absorbing stroke.

Figure 7:
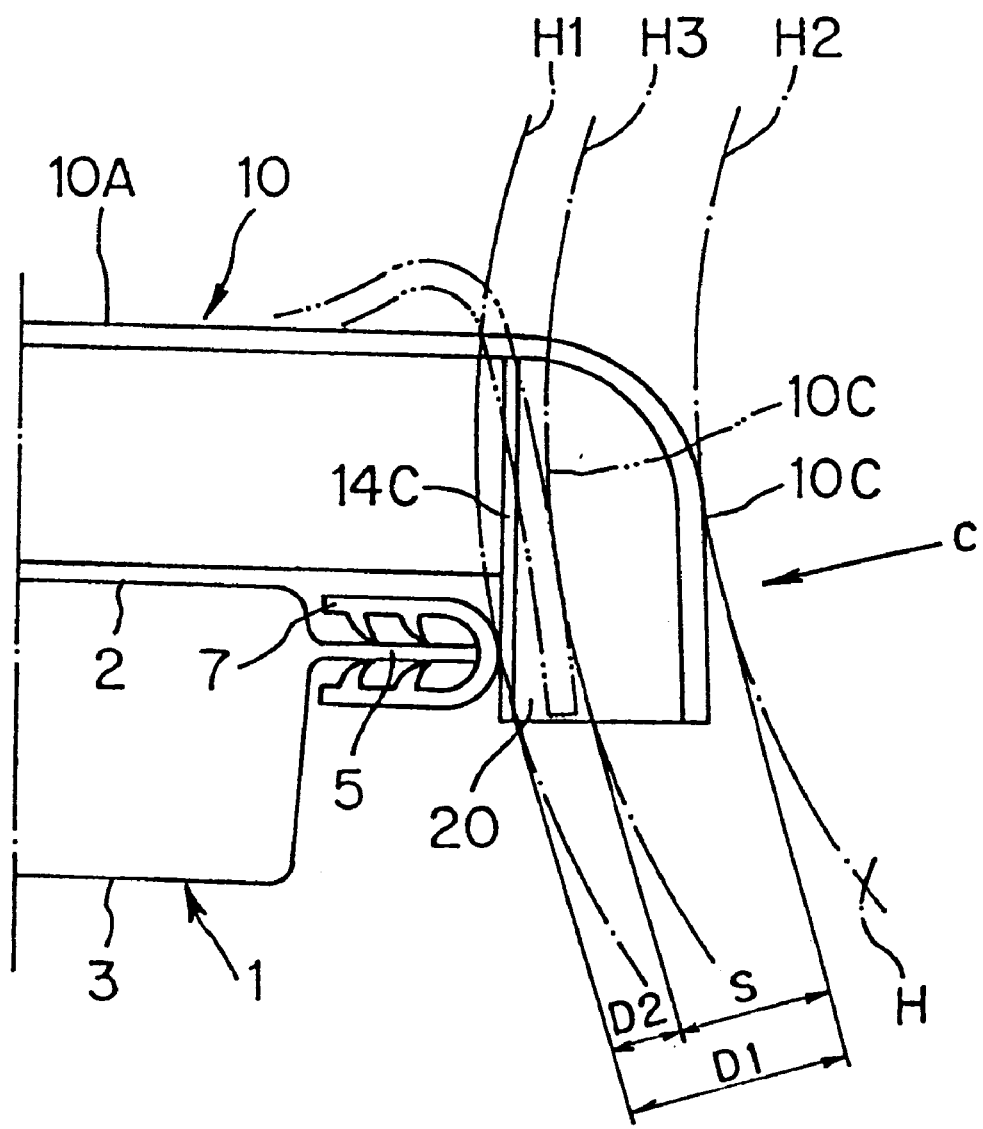
FIG. 7 is a fragmentary cross-sectional view of a pillar portion showing an action of an impact energy absorbing structure according to a first embodiment of the present invention for a cabin.

As is shown in FIG. 7, for example, in the case of an impact directed in a direction c from the curved side edge portion 10C of the trim 10, the impact energy is absorbed primarily by deforming and destructing the ribs 13. In a distance D1 (jutting-out width) between the surface of the trim 10 and the end edge of the flange portion 5, there are the rib 14C, which are kept in contact with inner edges of the ribs 13, and the flange trim 7 in addition to the trim 10. There is also a collapsed remain (in the drawing, the collapsed remain itself is omitted and only its remaining position is indicated) 20 of the ribs 13 and the like. Therefore, as an effective energy absorbing stroke S, a distance D1 between the surface of the trim 10 and the end edge of the flange portion 5 is decreased by a thickness D2 of these interposed matters (S=D1−D2).

Accordingly, when an object H imitating the occupant is caused to hit, it is most ideal that as is indicated by a sign H1, the impact energy be continuously absorbed until shortly before the object H comes to contact the end edge of the flange portion 5. In practice, however, the absorption of the impact must be completed while the object H advances from a position of H2 to a position of H3.

Because the width of the pillar portion is increased by the jutting-out of the trim 10 as much as the thickness D2, it is desired to reduce the juttingout.

Each of the following embodiments was designed by taking this matter into consideration.

Figure 8:
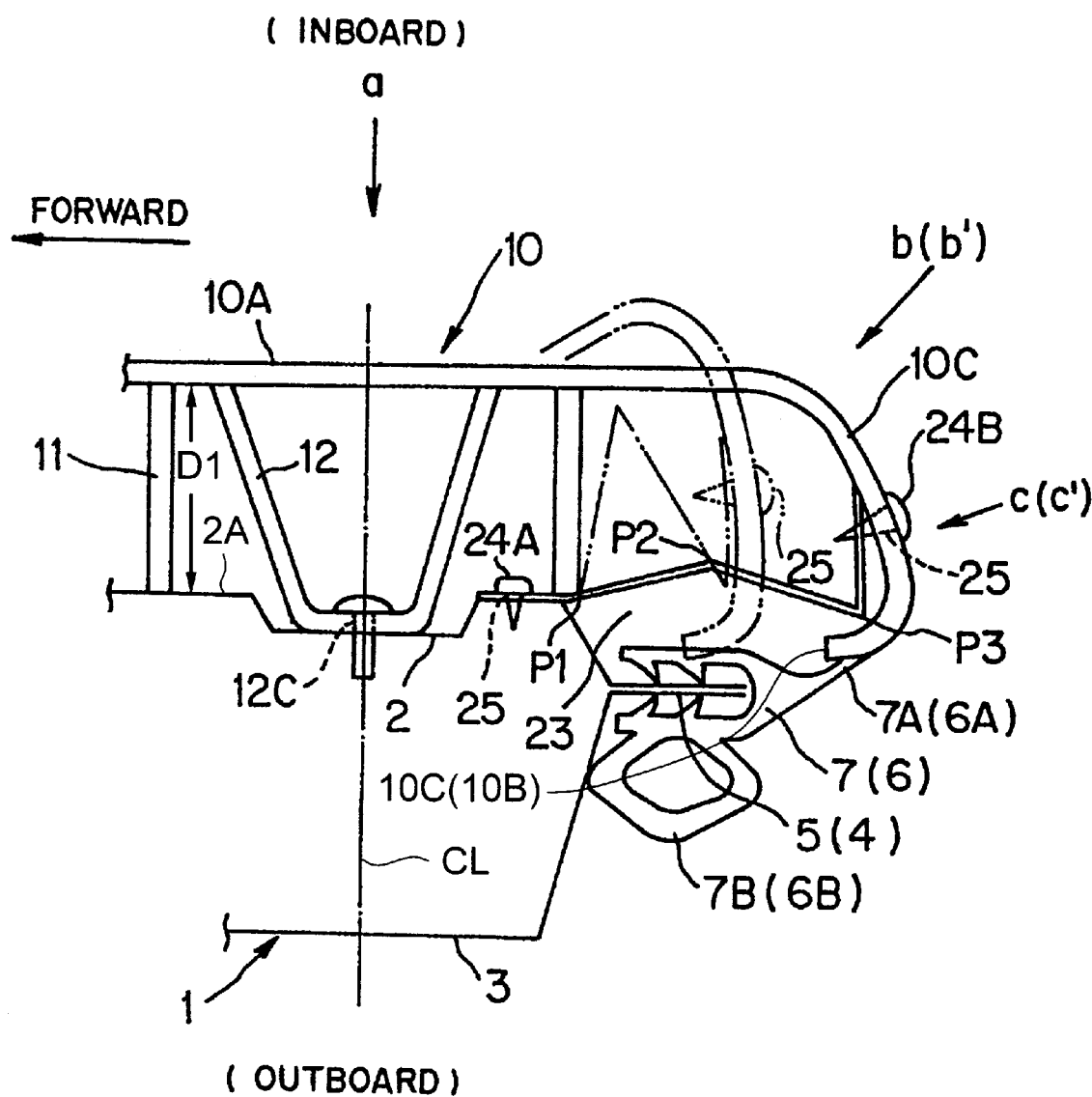
FIG. 8 is a fragmentary cross-sectional view of a pillar portion, illustrating a trim having an impact energy absorbing structure according to a fifth embodiment of the present invention for a cabin.
Figure 9:
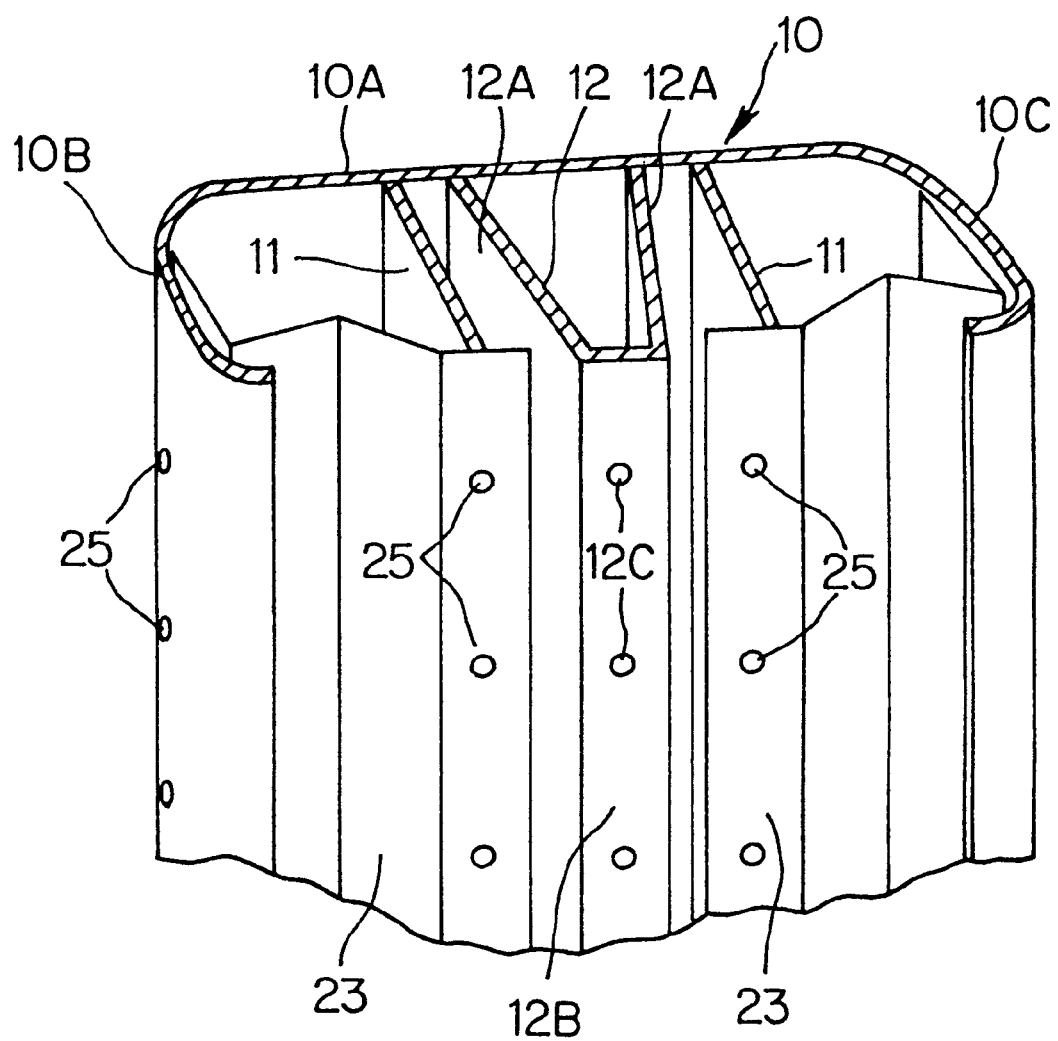
FIG. 9 is a perspective view showing a back side of the trim having the impact energy absorbing structure according to the fifth embodiment of the present invention for the cabin.

Referring now to FIG. 8 and FIG. 9, the fifth embodiment of the present invention will be described. The impact energy absorbing structure according to this embodiment is also illustrated in a situation as applied to a center pillar as a structural member constituting a cabin of an automotive vehicle.

FIG. 8 illustrates centering around a rear half portion of the center pillar. Centrally divided by a pillar center line CL indicated by a chain line, a front half portion is constructed in substantially the same design as the rear half portion.

As is shown in FIG. 8, a trim (trim member) 10 is mounted to cover an inboard side 2A of a pillar inner (inner member) 2 of a pillar (center pillar) 1. Arranged inside the trim 10 are impact absorbing ribs 11,12. As a result of mounting of the trim 10 on the pillar inner 2, the impact absorbing ribs 11,12 are interposed between the inboard side 2A of the pillar inner 2 and the trim 20. Incidentally, designated at numeral 3 is a pillar outer (outer member).

In this embodiment, the trim 10 and the impact absorbing ribs 11,12 are all made of a resin and moreover, the impact absorbing ribs 11,12 and the trim 10 have been formed by monolithic molding.

As is depicted in FIG. 8 and FIG. 9, the trim 10 is provided with a front portion 10A facing a front wall (inboard front wall) of the inboard side 2A extending up and down centrally relative to the direction of the width of the pillar inner 2, and also with curved side edge portions (side edge portions) 10B,10C formed in configurations smoothly curved from opposite side edges of the front portion 10A so that the side edge portions cover, from the inboard side, flange portions 4,5 formed at edge portions of the pillar inner 2 (inboard edge portions of the pillar 1). In this embodiment, end edges 10b,10c of the curved side edge portions 10B,10C are formed somewhat inboard the positions of the flange portions 4,5 and are arranged to cover the flange portions 4,5 from the inboard side. The curved side edge portions have therefore improved the inboard outward appearance around the pillar portion.

The front portion 10A of the trim 10 is spaced by a predetermined distance D1 from the inboard side 2A of the pillar inner 2. The impact absorbing ribs 11,12 are formed on the back side of such a trim 10, and are arranged so that they are interposed between the front portion 10A and the inboard side 2A. Further, the impact absorbing rib 12 is arranged centrally relative to the direction of the width of the trim 10 and the impact absorbing ribs 11 are arranged on both sides of this impact absorbing rib 12.

Of these ribs, the impact absorbing ribs 11 are formed, on the back side of the front portion 10A of the trim 10, as flat walls perpendicular to the front portion 10A and also to the central portion of the inboard side 2A of the pillar inner 2. On the other hand, the impact absorbing rib 12 is formed of a pair of oblique flat wall 12A, which are arranged at a certain small angle with respect to the front portion 10A and also to the central portion of the inboard side 2A of the pillar inner 2, and a central planar wall 12B maintained in contact with the inboard side 2A of the pillar inner 2. Through the central planar wall 12B, screw holes 12C are formed so that the trim 10 is threadedly secured on the pillar inner 2 by way of screws 22. The impact absorbing rib 12 is constructed as an impact absorbing member and also as a mounting member.

These impact absorbing ribs 11,12 primarily absorb an impact from a frontal direction of the pillar inner 2 (in the direction a) and also absorb portions of an impact from an oblique direction of the pillar inner 2 (in the direction b or b').

In particular, the rigidities of the trim 10 itself and of the individual ribs 11,12 and the distances D1,D2 between the trim 10 and the pillar inner 2 are set so that in association with a below-described bracket 23 as an impact absorbing member made of a sheet metal, the energy of an impact of a predetermined magnitude applied, for example, in the direction a, the direction b or b' or the direction c or c' can be absorbed before the trim 10 hits the surface of the pillar inner 2. Incidentally, the rigidities of the trim 10 and the individual ribs 11,12 can be set at desired values depending on the individual thicknesses T,T1,T2 and gaps D3,D4 although the rigidities vary depending of their materials. In addition, an angle θ of the rib 12 can also contribute to the rigidity adjustment.

On the other hand, the curved side edge portions 10B,10C are spaced only by a predetermined distance D2 from the flange portions 4,5 of the pillar inner 2, and between the curved side edge portions 10B,10C and the pillar inner 2, the trim-mounting bracket as an impact absorbing member made of a sheet metal (hereinafter called the "impact absorbing bracket") is interposed. This impact absorbing bracket 23 is made of the sheet metal, and connected at opposite end portions thereof with the pillar inner 2 and the curved side edge portions 10B,10C by tapping screws or screws 24A, 24B so that the trim 10 is fixed on the pillar inner 2. Tapping holes or screw holes 25 are therefore formed in the pillar inner 2 and the curved side edge portions 10B,10C.

Further, the impact absorbing bracket 23 made of the sheet metal has been bent beforehand at bent points P1,P2, P3. When an impact is applied in a direction of small obliqueness relative to the pillar inner 2 (in the direction c or c'), this impact absorbing bracket 23 absorbs impact energy while increasing the degrees of bending at the bent points P1,P2,P3. Especially, the deformation mode of the bracket at the time of bending is set in such a way that the end portions of the curved side edge portions 10B,10C are guided to a side inboard relative to the flange portions 4,5 as indicated by chain lines in FIG. 8.

The bracket 23 primarily absorbs an impact applied in a direction of small obliqueness relative to the pillar inner 2 (in the direction c or c'), and in cooperation with the impact absorbing ribs 11,12, also absorbs a portion of an impact applied in a direction oblique to the pillar inner 2 (in the direction b or b').

The rigidity of the bracket 23 is therefore set so that with respect to an impact of a predetermined magnitude applied in the direction c or c' or the direction b or b', for example, its energy can be absorbed before the trim 10 hits the surface of the pillar inner 2. Of course, the rigidity of the bracket 23 is set in relation to the rigidities and the like of the above-mentioned trim 10 and individual ribs 11,12.

Incidentally, such deformation mode of the bracket 23 can be set by adjusting the fixed points of the bracket 23 (the points connected by the tapping screws or screws 24A,24B) and the distances between the bent points P,P2,P3. It is to be noted that, although the expression "points" like "bent points" and "fixed points" are used herein, they mean points as viewed in plan like FIG. 8, and that the bracket 23 actually has a length in a vertical direction as illustrated in FIG. 9 and the bent points and fixed points are in the forms of lines as a matter of fact.

In this embodiment, an end portion of each impact absorbing rib 11, said end portion being on the side of the pillar inner 2, is maintained in contact with an end portion of the bracket 23, said end portion being on the side of the pillar inner 2.

Further, in this structure, lip-shaped extensions 6A,7A jut out from outer end portions of flange trims fitted on the flange portions 4,5, respectively. These extensions 6A,7A are joined to outboard surfaces of the curved side edge portions 10B,10C of the trim 10. Incidentally, designated at signs 6B,7B are weather strips formed integrally with the flange portions 4,5, respectively.

The impact energy absorbing structure according to the fifth embodiment of the present invention for the cabin is constructed as described above. When an occupant is about to hit the pillar 1, the occupant is therefore protected by damping the resulting impact as will be described hereinafter.

As is shown in FIG. 8 by way of example, when an impact is applied to the front portion 10A of the trim 10 in the direction a, the impact absorbing ribs 11,12 primarily bear this impact and, while these ribs 11,12 undergo buckling deformation and in some instances, destruction under the impact energy, the impact energy is absorbed before the front portion 10A of the trim 10 reaches the pillar inner 2.

Hence, even when the occupant hits the front portion 10A of the trim 10 in the direction a, the impact can be damped to a certain level or less to protect the occupant.

When an impact is applied to the front portion 10A and the curved side edge portion 10B or 10C in the trim 10 in the direction b or b' as shown, for example, in FIG. 8, the ribs 11,12 bear this impact in cooperation with the impact absorbing bracket 23 and, while under the impact energy these ribs 11,12 undergo buckling deformation and in some instances, destruction and the bracket 23 undergoes bending deformation, the impact energy is absorbed before the trim 10 reaches a corner portion of the pillar inner 2. Hence, even when the occupant hits the trim 10 in the direction b or b', the impact can be damped to a certain level or less to protect the occupant.

When an impact is applied to the curved side edge portion 10B or 10C in the direction c' or c as shown, for example, in FIG. 8, the bracket 23 primarily bears the impact in this case and, while the bracket 23 undergoes bending deformation (through elastic deformation or plastic deformation), the impact energy is absorbed before the trim 10 reaches the position of the flange portion 4 or 5 of the pillar 1. Hence, even when the occupant hits the trim 10 in the direction c or c', the impact can be damped to a certain level or less to protect the occupant.

Especially when this impact in the direction c or the direction c' is applied, the end portion of the curved side edge portion 10B or 10C advances inboard towards the flange portion 4 or 5 under the guidance of bending of the bracket 23 as indicated by chain lines in FIG. 8. It is therefore possible to continue the absorption of the impact energy until the surface of the curved side edge portion 10B or 10C reaches the free end or so of the flange portion 4 or 5.

Namely, effects of the thicknesses of the trim, ribs and the like and a collapsed remainder of the ribs or the like are eliminated and, when the object H imitating the occupant is caused to hit, impact energy can be continuously absorbed until shortly before the object H comes to contact with the end edge of the flange portion 5 as indicated by the sign H1 in FIG. 7. Accordingly, the distance D1 between the surface of the trim 10 and the flange portion 5 (see FIG. 7) can be effectively used in its entirety as an impact energy absorbing stroke S.

As a result, it is therefore possible to obtain effects such that, while sufficiently retaining the absorbing stroke S, the width of the pillar portion is prevented from broadening to avoid a reduction in the width of the door opening and hence to assure the ease of cabin entry and exit and also to improve the external appearance (outward appearance) of the vehicle.

Further, the trim-mounting bracket 23 contributes to a reduction in the number of parts and/or brackets because it also serves as an impact absorbing member.

In addition, the curved side edge portion 10B,10C of the trim 10 are arranged to cover the flange portions 4,5 from the inboard side so that the external appearance of the cabin is improved around the pillar portion.

In this construction, the lip-shaped extensions 6A,7A of the flange trims 6,7 are joined to the outboard surfaces of the curved side edge portions 10B,10C of the trim 10 so that the interior of the trim 10 is shielded. Therefore the construction is also effective in improving the external appearance (outward appearance) of the vehicle.

Moreover, the end portions of the impact absorbing ribs 11, said end portions being on the side of the pillar inner, are kept in contact with end portions of the brackets 23, said end portions being on the side of the pillar inner 2, in this embodiment. This makes it possible to set large the distance between the two impact absorbing ribs 11,11 or the distances between the impact absorbing ribs 11 and the impact absorbing rib 12. Against an impact from a frontal direction (in the direction a), deformation of the bracket 23 can also be used. This is effective in improving the impact absorbing performance and in increasing the stroke S for absorbing impact energy from the frontal direction (in the direction a) or from an oblique direction (the direction b or b').

The feature that the extensions 6A,7A are arranged and the feature that the end portion of each impact absorbing rib 11 is kept in contact with the bracket 23 are not essential for the assurance of an absorbing stroke S for impact in the direction c or c' and may therefore be omitted.

Figure 10:
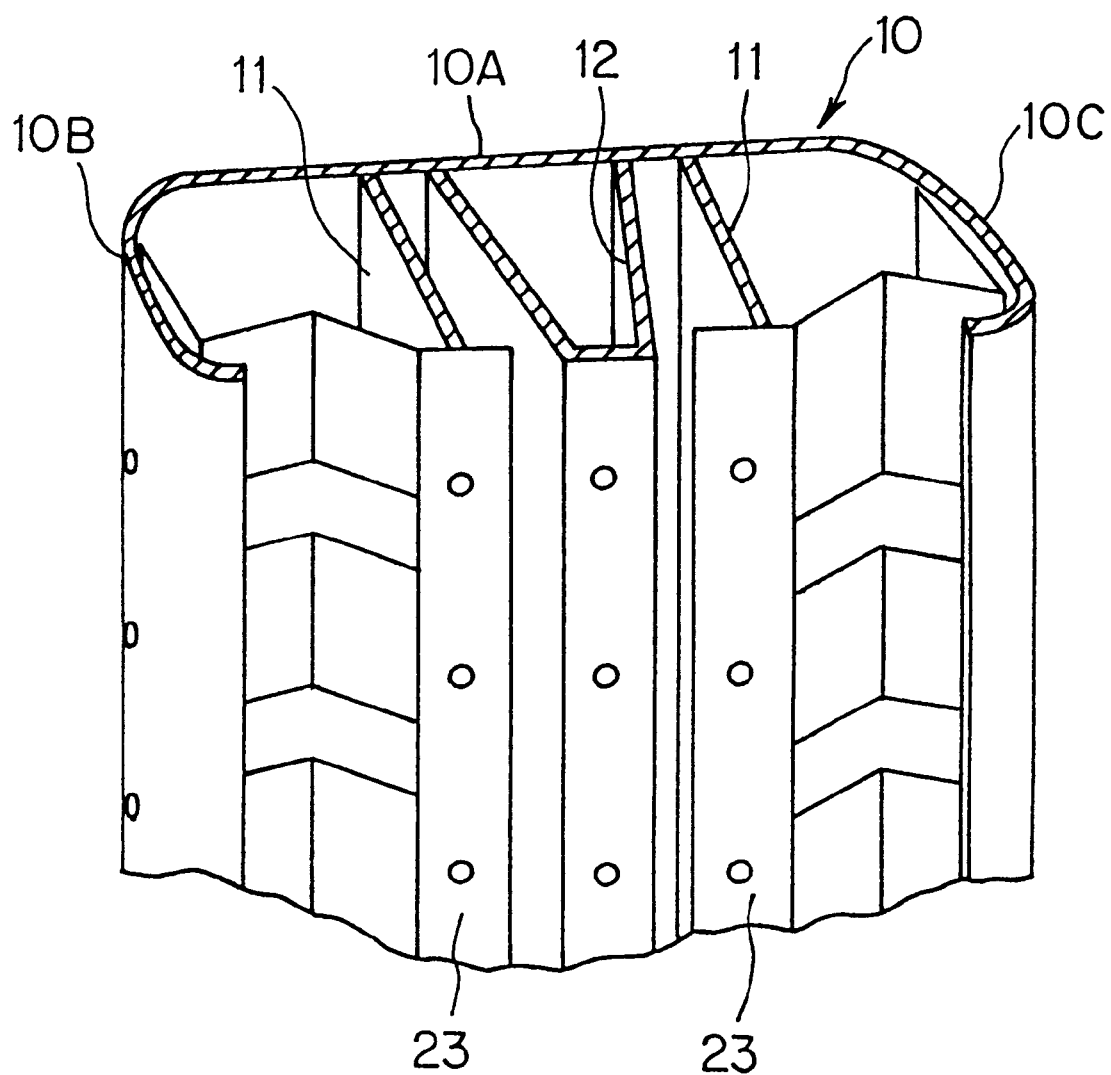
FIG. 10 is a perspective view of a back side of a trim, illustrating a modification of the impact energy absorbing structure according to the fifth embodiment of the present invention for the cabin.

The bracket 23 is formed in the shape of a plate continuously extending in the direction of the length of the pillar 1 in this embodiment. The bent portions (i.e., the portions where impact energy is absorbed) of the bracket 23 can be arranged in a discontinuous form as shown, for example, in FIG. 10. In this modification illustrated in FIG. 10, only the bent portions are cut off. It is however possible to divide the bracket 23 itself into plural pieces and to arrange it as discontinuous members.

Figure 11:
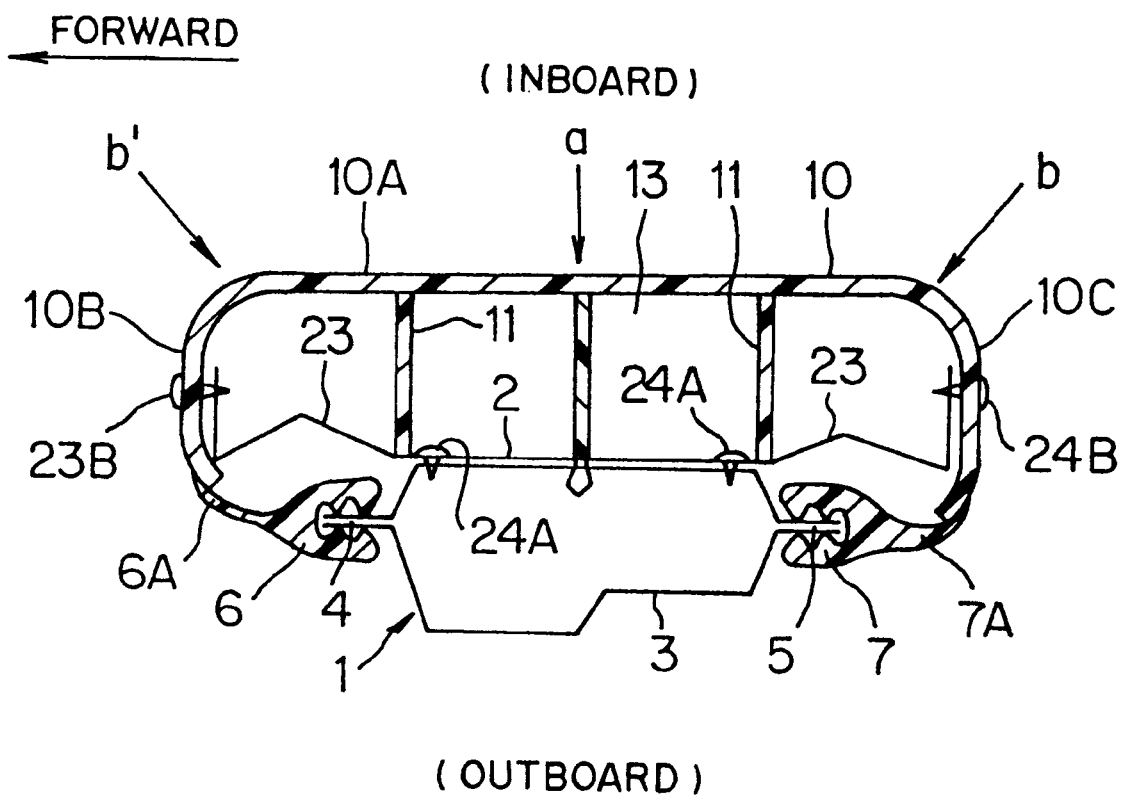
FIG. 11 is a fragmentary cross-sectional view of a pillar portion, showing another modification of the impact energy absorbing structure according to the fifth embodiment of the present invention for the cabin.

As is illustrated in FIG. 11, it is also possible to arrange impact absorbing ribs 13, which are substantially equal to the impact absorbing ribs, between the impact absorbing ribs 11,11 instead of the impact absorbing rib 12 which also serves as a mounting member and then to effect the mounting of the trim 10 by fittedly inserting a mounting clip 16, which is attached to an end portion of the impact absorbing rib 13, in a hole formed in the pillar inner 2.

The ribs 11,12 are integrally formed with the trim 10. They can, however, be discrete members. Further, like the ribs 11,12, members for absorbing impact energy from a frontal direction (in the direction a) or from an oblique direction (in the direction b or b') can be made of a metal or the like other than a resin to make use of its elastic deformation or plastic deformation. A cushioning material, such as rubber or urethane, can also be used in combination with these members.

Referring next to FIG. 12 to FIG. 15, the sixth embodiment of the present invention will be described. This embodiment will be described taking, as an example, the impact energy absorbing structure applied to a center pillar.

Figure 12:
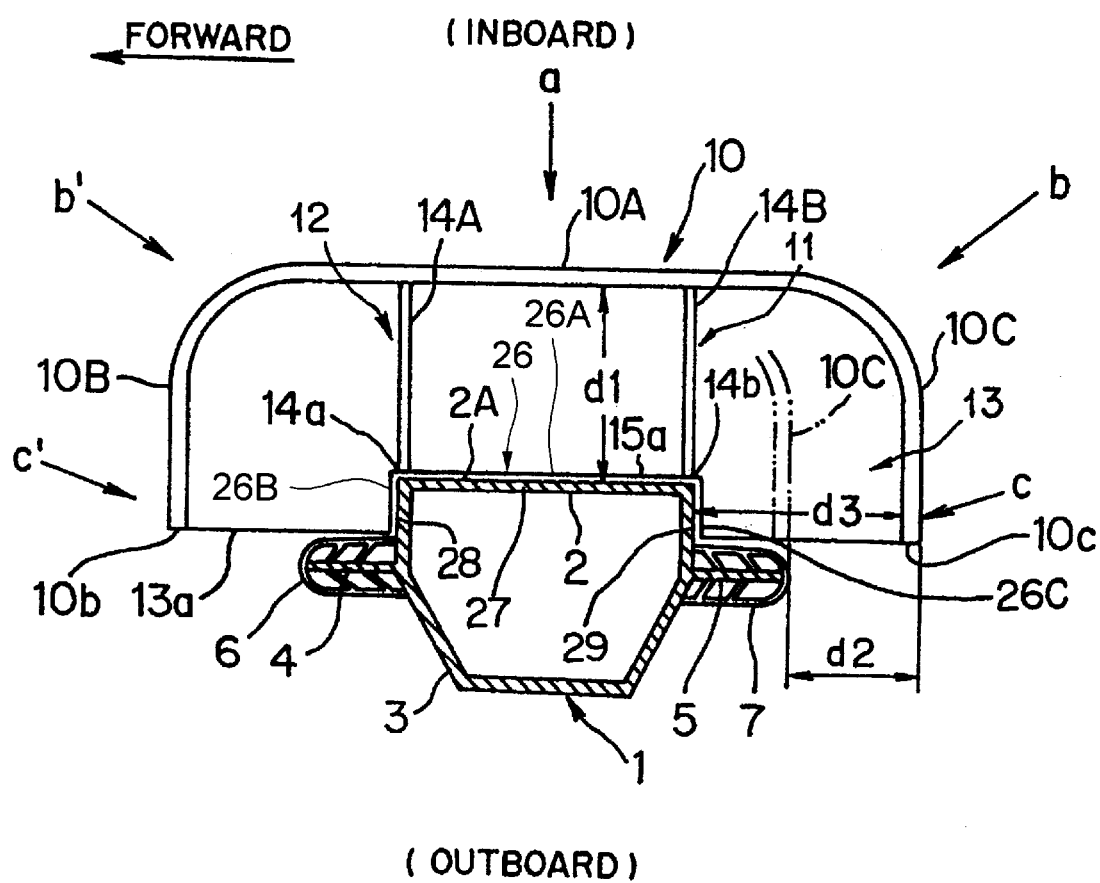
FIG. 12 is a cross-sectional view of a pillar portion, showing an impact energy absorbing structure according to a sixth embodiment of the present invention for a cabin.

As is depicted in FIG. 12, a trim (trim member) 10 is arranged so that an inboard side 2A of a pillar inner (inner member) 2 of a pillar (center pillar) 1 is covered. Inside the trim 10, impact absorbing ribs 11 and a pillar-contacting portion 26 are arranged. By mounting the trim 10 on the pillar inner 2 so that the pillar-contacting portion 26 is kept in contact with the pillar inner 2, the impact absorbing ribs 11 are interposed between the inboard side 2A of the pillar inner 2 and the trim 10.

In this embodiment, the trim 10 and the impact absorbing ribs 11 are both made of a resin. In particular, the impact absorbing ribs 11 are formed with the trim 10 by monolithic molding.

Incidentally, numeral 3 indicates a pillar outer (outer member). The pillar inner 2 and the pillar outer 3 are provided at opposite edge portions thereof with flange portions, and joined together at the corresponding flange portions by welding or the like, whereby joined flange portions (hereinafter called the "flange portions") are formed.

The pillar inner 2 is provided with a front wall 27 directed straight inboard (in the direction of the width of the vehicle) and also with side edge wall portions 28,29 directed inward and frontward (in the direction of the length of the vehicle) and inward and rearward (in the direction of the length of the vehicle), respectively. The front wall portion 27 extends in the pillar inner 2 up and down centrally relative to the direction of the width of the vehicle, while the side edge wall portions 28,29 extend in the pillar inner 2 up and down on opposite sides of the front wall portion 27. On the other hand, the flange portions 4,5 are formed outside the side edge wall portions 28,29. Further, the side edge wall portions 28,29 are directed in a direction substantially perpendicular to the front wall portion 27.

Figure 13:
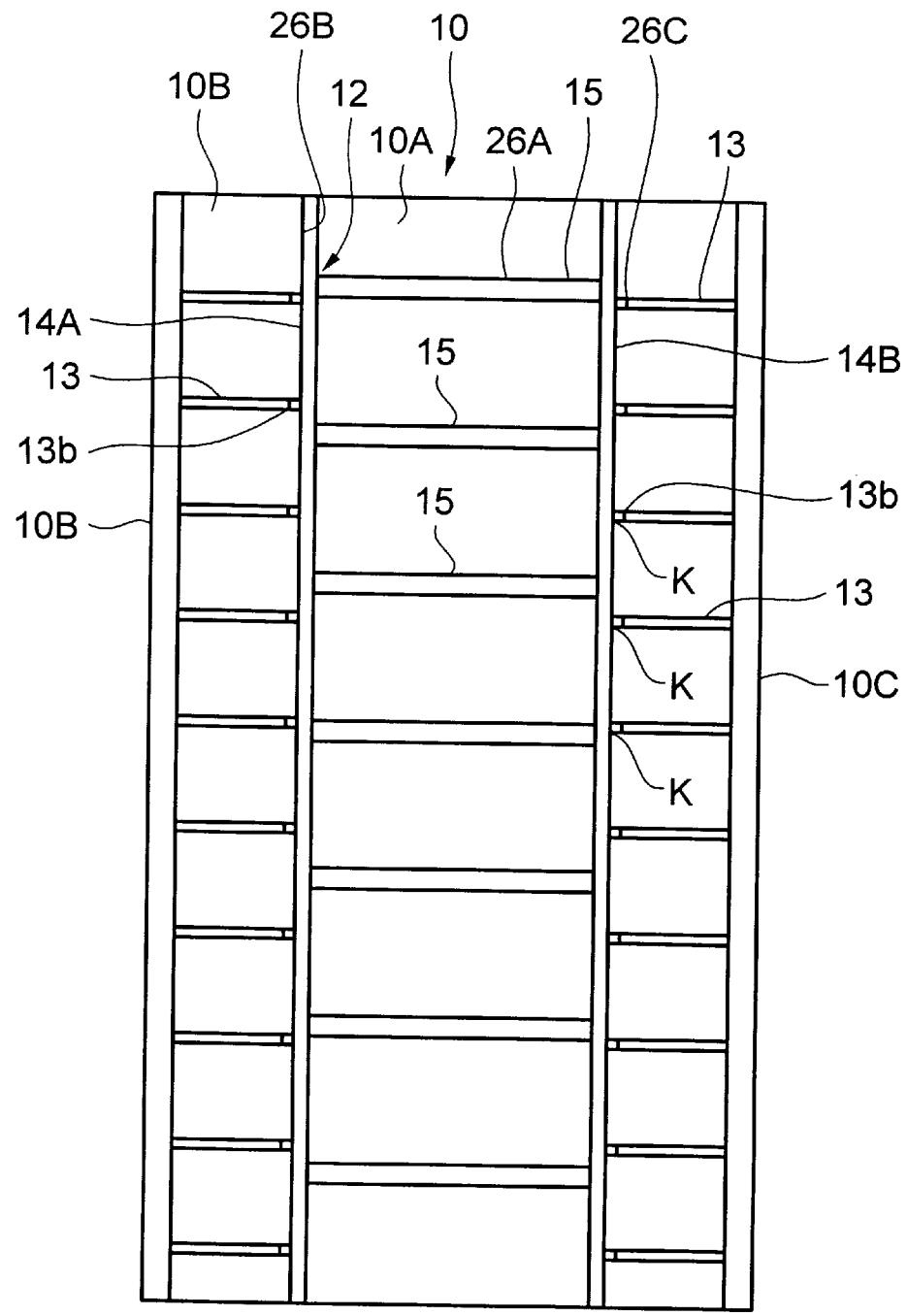
FIG. 13 is a front view showing a back side of a trim having the impact energy absorbing structure according to the sixth embodiment of the present invention for the cabin.

As illustrated in FIG. 12 and FIG. 13, the trim 10 is provided with a front portion 10A facing the front wall portion 27, which extends up and down centrally relative to the direction of the width of the pillar inner 2, and also with curved side edge portions 10B,10C formed in configurations smoothly curved from opposite side edges of the front portion 10A. The curved side edge portions 10B,10C cover the side edge wall portions 28,29, which are formed on the edge portions of the pillar inner 2, and also the flange portions 4,5 from the inboard side. Further, end edges 10b,10c of the curved side edge portions 10B,10C are located at positions somewhat inboard the positions of the flange portions 4,5.

Further, the pillar-contacting portion 26 of the trim 10 is provided with a front portion 26A kept in contact with the front wall portion 27 of the pillar inner 2 and also with side edge portions 26B,26C maintained in contact with the side edge wall portions 28,29, respectively.

The impact absorbing ribs 11 are formed on the back side of the trim 10 and, as illustrated in FIG. 12 and FIG. 13, are provided with front impact absorbing ribs (hereinafter called the "front ribs") 12 formed on the back side of the front portion 10A of the trim 10 and also with edge impact absorbing ribs (hereinafter called the "edge ribs") 13 formed on back sides of the curved side edge portions 10B,10C of the trim 10.

The front ribs 12 are constructed by connecting plural vertical ribs 14A,14B, which are arranged at predetermined intervals so that they extend in the direction of the length of the pillar 1, with plural lateral ribs 15 which are arranged at predetermined intervals so that they extend in the direction of the width of the pillar 1. By these vertical ribs 14A,14B, and plural lateral ribs 15, the front ribs 12 are formed into a honeycomb structure in which rectangular cells are arrayed.

Incidentally, free ends 14a,14b of the vertical ribs 14A, 14B, and free ends of the lateral ribs 15 are all joined to the front portion 26A of the pillar-contacting portion 26 so that with respect to an impact from a front direction (in the direction a), impact energy can be absorbed while exhibiting adequate rigidity in association with the front wall portion 27 of the pillar inner 2 via the front portion 26A.

The plural edge ribs 13 are arranged at predetermined intervals so that they extend in the direction of the width of the pillar 1 in parallel with the lateral ribs 15. Their side edges 13a are formed up to the end edges of the curved side edge portions 10B,10C of the trim 10. In addition, the free ends 13b are joined to outer surfaces of the vertical ribs 14A,14B and side edge portions 26B,26C of the pillar-contacting portion 26, whereby a sort of honeycomb structure with substantially square cells arrayed therein is formed. Here, relatively large rigidity is required for the curved side edge portions 10B,10C of the trim 10 to absorb impacts so that the edge ribs 13 are arranged at a higher density than the lateral ribs 15.

Further, the side edge portions 26B,26C of the pillar-contacting portion 26 and the side edges 13a of the edge ribs 13 are located inboard the flange trims 6,7 of the flange portions 4,5 similarly to the end edges 10b,10c of the curved side edge portions 10B,10C of the trim 10. For example, when an impact is applied at a small angle, i.e., in the direction c or c' to the curved side edge portion 10B or 10C of the trim 10, the curved side edge portion 10B or 10C of the trim 10 can undergo displacement without interference with the corresponding flange portion 4 or 5.

To provide the trim 10 itself and the respective ribs 13,14A,14B,15 with predetermined rigidities, their thicknesses and intervals are set at predetermined values. When an impact load of a predetermined magnitude is applied from the surface of the trim 10, its impact energy is gradually absorbed while the individual ribs 13,14A,14B,15 undergo buckling and further destruction. At this time, an object, which is used as the impact load, is reduced in speed and stopped while applying resisting force against the object.

If the resisting force applied to the object is excessively large at this time, sufficient damping cannot be achieved. It is therefore necessary to limit the rigidities of the individual ribs 13,14A,14B,15 so that their rigidities are prevented from becoming excessively high, namely, so that an effective damping action can be obtained. If the rigidities of the individual ribs 13,14A,14B,15 are too low conversely, a substantial distance is needed until the object is stopped. Accordingly, the rigidities of the individual ribs 13,14A, 14B,15 should not be excessively low.

Distances d1,d2,d3 between the trim 10 and the pillar inner 2 are also set to conform with the rigidities of the individual ribs 13,14A,14B,15 so that, when an impact load of a predetermined magnitude is applied from the surface of the trim 10, its impact energy can be fully absorbed through buckling and subsequent destruction of the individual ribs 13,14A,14B,15 before the trim 10 comes to contact with the side of the pillar inner 2.

Figure 14:
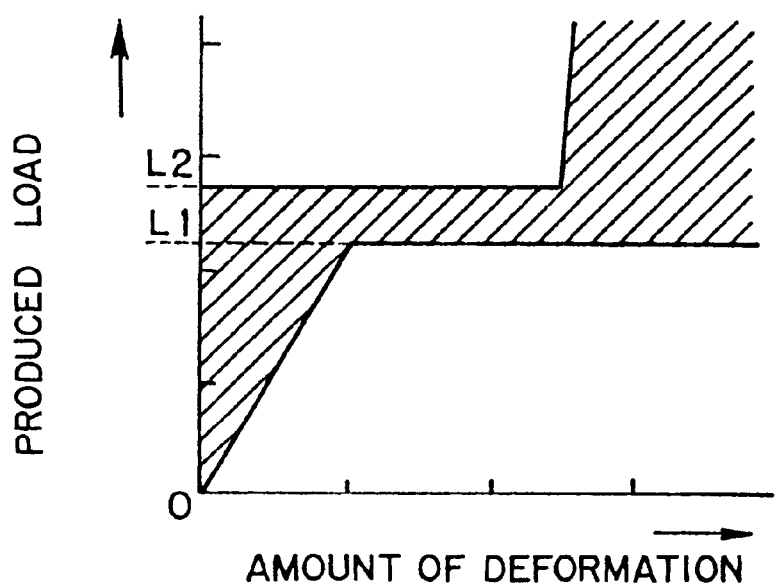
FIG. 14 is a diagram showing setting of loads to be produced by the impact energy absorbing structure according to the sixth embodiment of the present invention for the cabin.

Incidentally, FIG. 14 illustrates produced loads versus amounts of deformation. It is desired to set in such a way that the produced load as a function of the amount of deformation falls, for example, within such a range as indicated by hatching in the diagram. It is particularly desired to limit the produced load within a range of from L1 to L2. In this case, it is desired to make the amount of the deformation as small as possible.

Figure 15:
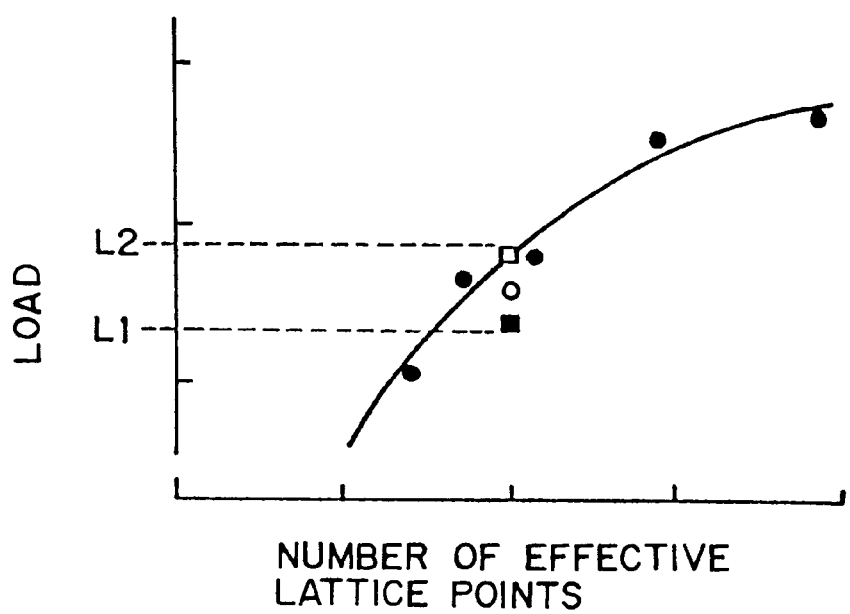
FIG. 15 is another diagram showing the setting of loads to be produced by the impact energy absorbing structure according to the sixth embodiment of the present invention for the cabin.

When load characteristics are tested by changing the number of effective lattice points as shown in FIG. 15, characteristics substantially similar to the curve B1 can be obtained although they vary depending on the shape. It is therefore possible to set loads within the range of L1 to L2 by choosing an adequate number of effective lattice points. Incidentally, the individual points shown in FIG. 15 represent experimental data and are varied in shape in accordance with samples.

The term "the number of effective lattice points" as used herein means the number of lattice points acted on by an object out of points (lattice points) where vertical ribs and lateral ribs intersect with each other as indicated by letter K in FIG. 13.

The impact energy absorbing structure according to the sixth embodiment of the present invention for the cabin is constructed as described above. When an occupant is about to hit the pillar 1, the occupant is therefore protected by damping the resulting impact as will be described hereinafter.

As is shown in FIG. 12 by way of example, when an impact is applied to the front portion 10A of the trim 10 in the direction a, the lateral ribs 15 and the vertical ribs 14A,14B primarily bear the impact and, while these ribs 14A,14B,15 undergo buckling deformation and in some instances, destruction under the impact energy, the impact energy is absorbed before the front portion 10A of the trim 10 reaches the pillar inner 2. Hence, even when the occupant hits the front portion 10A of the trim 10 in the direction a, the impact can be damped to a certain level or less to protect the occupant.

When an impact is applied to a connecting part between the front portion 10A and the curved side edge portion 10B or 10C in the trim 10 in the direction b' or b as shown, for example, in FIG. 12, the edge ribs 13 and the rib 14A or 14C primarily bear the impact and, while these ribs 13 and rib 14A or 14C undergo buckling deformation and in some instances, destruction under the impact energy, the impact energy is absorbed before the trim 10 reaches a corner portion of the pillar inner 2. Hence, even when the occupant hits the trim 10 in the direction b, the impact can be damped to a certain level or less to protect the occupant.

When an impact is applied to the curved side edge portion 10B or 10C in the direction c' or c as shown, for example, in FIG. 12, the edge ribs 13 also primarily bear the impact in this case and, while the ribs 13 undergo buckling deformation and in some instances, destruction under the impact energy, the impact energy is absorbed before the trim 10 reaches the position where the flange portion 4 or 5 of the pillar 1 is exposed. Hence, even when the occupant hits the trim 10 in the direction b, the impact can be damped to a certain level or less to protect the occupant.

Especially when an impact is applied in the direction c' or the direction c, the curved side edge portion 10B or 10C of the trim 10 undergoes displacement in addition to deformation and destruction of the ribs 13. In this structure, as indicated by chain lines in connection with the curved side edge portion 10C, the curved side edge portion 10B or 10C can undergo displacement without interference with the corresponding flange portion 4 or 5. Even if there is a collapsed remain 20 of the ribs 13 or the like, the distance (jutting-out width) D1 between the surface of the trim 10 and the end edge of the flange portion 5 can be used in its entirety as an effective energy absorbing stroke S.

Namely, effects of the thicknesses of the trim and ribs and a collapsed remainder of the ribs or the like are eliminated and, when the object H imitating the occupant is caused to hit, impact energy can be continuously absorbed until shortly before the object H comes to contact with the end edge of the flange portion 5 as indicated by the sign H1 in FIG. 7. Accordingly, the distance D1 between the surface of the trim 10 and the flange portion 5 (see FIG. 7) can be effectively used in its entirety as an impact energy absorbing stroke S.

As a result, it is therefore possible to obtain effects such that, while sufficiently retaining the absorbing stroke S, the width of the pillar portion is prevented from broadening to avoid a reduction in the width of the door opening and hence to assure the ease of cabin entry and exit and also to improve the external appearance (outward appearance) of the vehicle.

In addition, the curved side edge portion 10B,10C of the trim 10 are arranged to cover the flange portions 4,5 from the inboard side so that the external appearance of the cabin is improved around the pillar portion.

Figure 16:
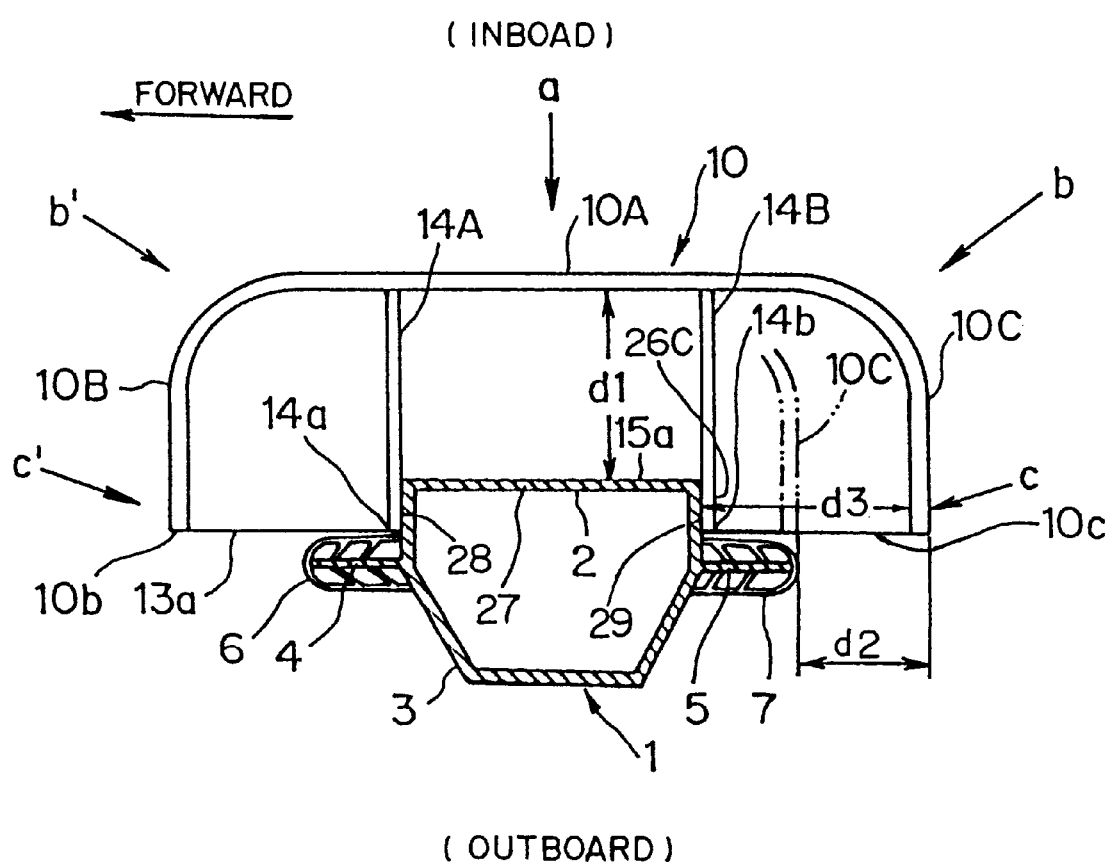
FIG. 16 is a cross-sectional view of a pillar portion, showing a modification of the impact energy absorbing structure according to the sixth embodiment of the present invention for the cabin.

Further, as is shown in FIG. 16, it is also possible to construct the structure by omitting the pillar-contacting portion 26 of the trim 10, joining inner sides of free end portions of the ribs 14A,14B to the side edge wall portions 28,29 of the pillar inner 2 and keeping the free ends 15a of the ribs 15 in contact with the front wall portion 27 of the pillar inner 2. In this case, the free ends 14a,14b of the ribs 14A,14B are both extended to the side edges 13a of the edge ribs 13 and also to the end edges 10b,10c of the curved side edge portions 10B,10C of the trim 10.

Figure 17:
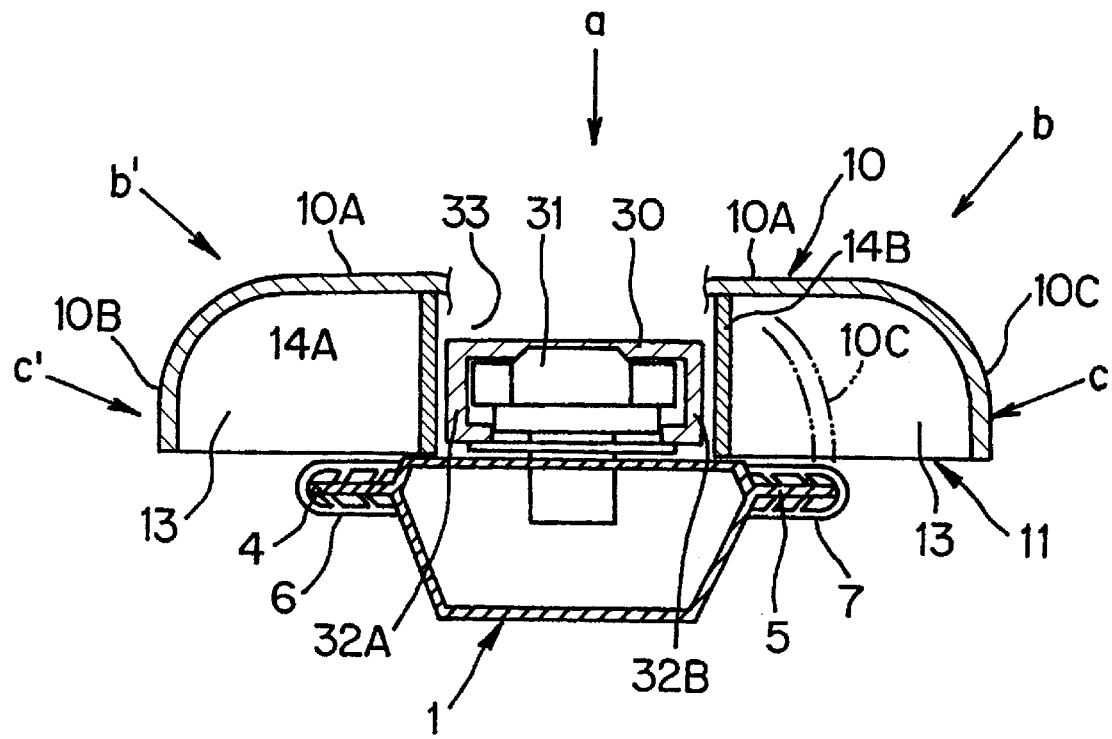
FIG. 17 is a cross-sectional view, along line XVII—XVII in FIG. 18, of a pillar portion, showing an impact energy absorbing structure according to a seventh embodiment of the present invention for a cabin.
Figure 18:
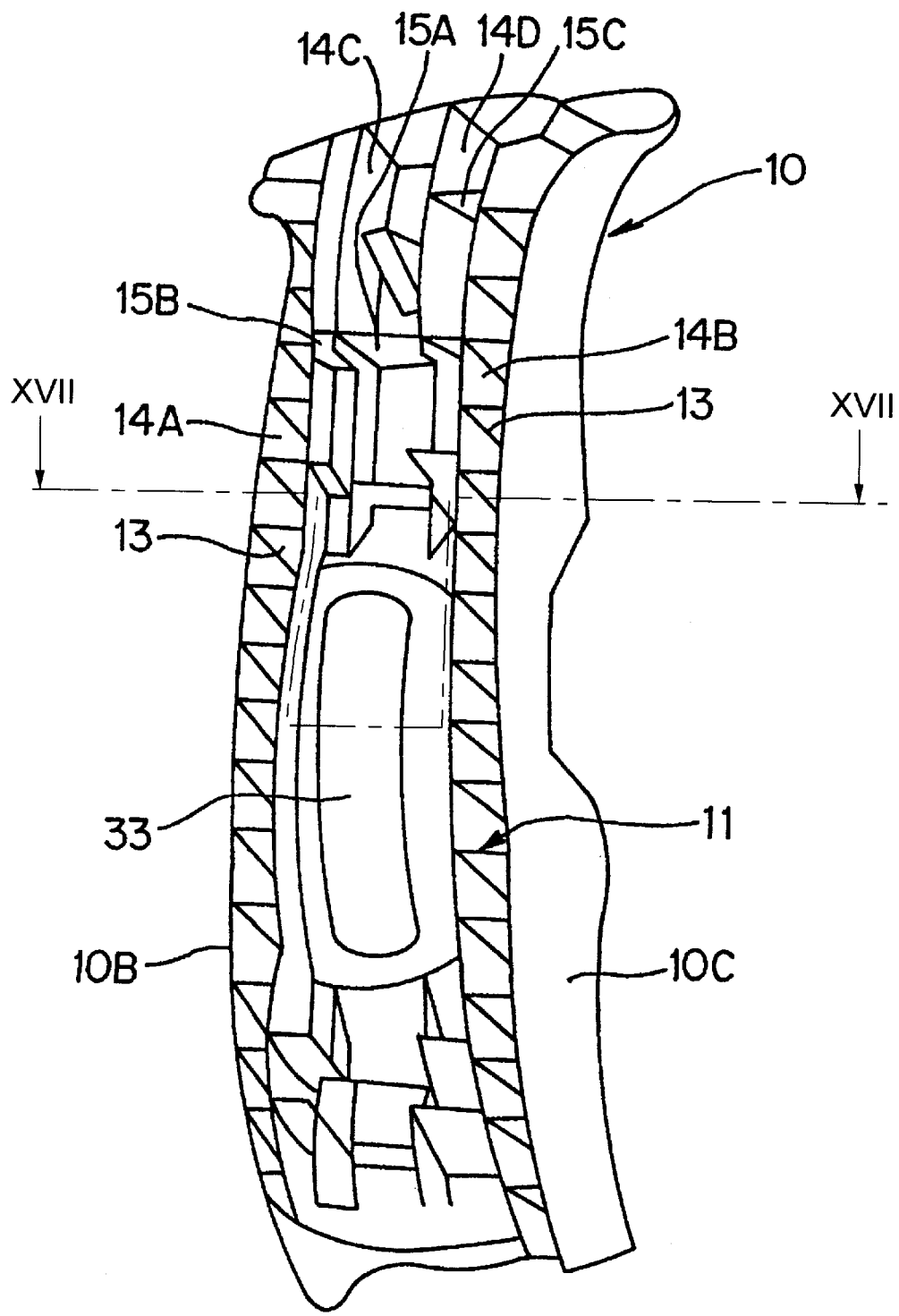
FIG. 18 is a perspective view showing a back side of the trim having the impact energy absorbing structure according to the seventh embodiment of the present invention for the cabin.
Figure 19:
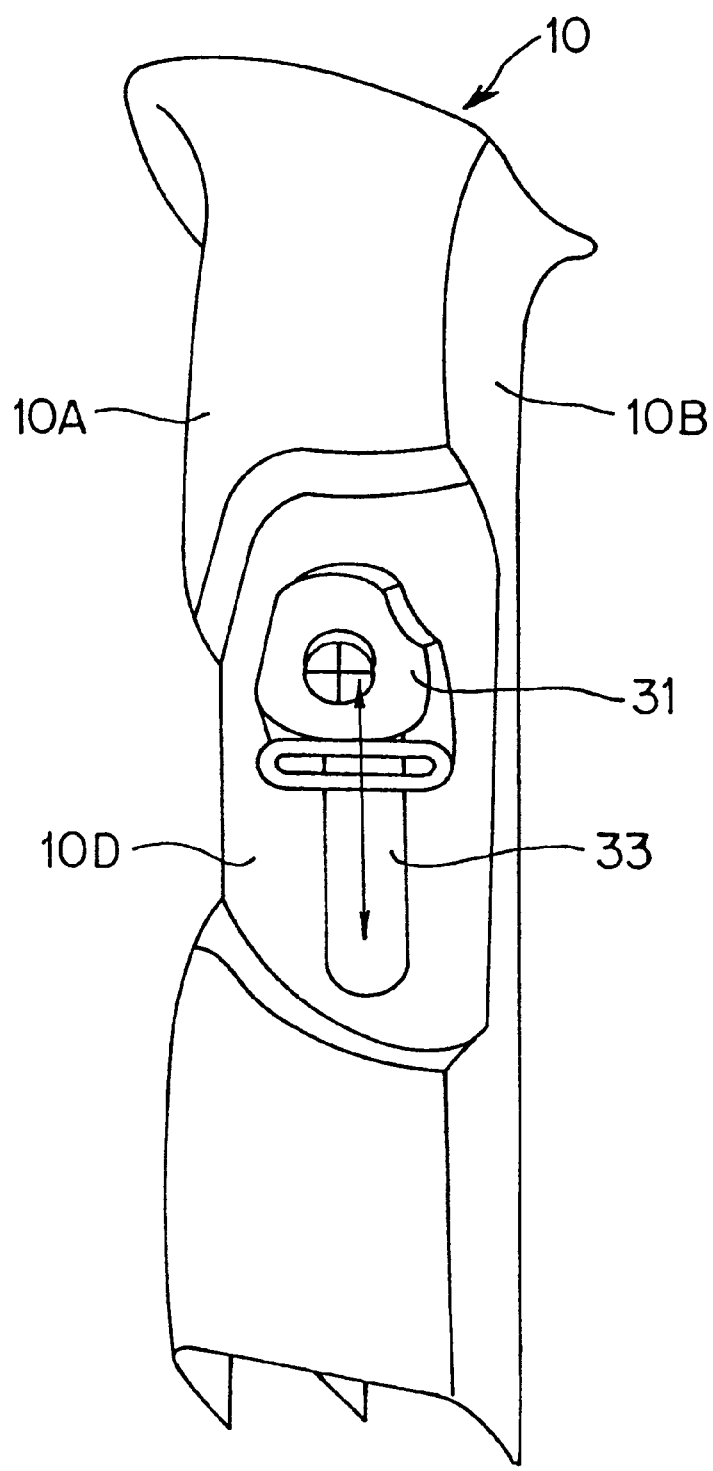
FIG. 19 is a perspective view showing a front side of the trim having the impact energy absorbing structure according to the seventh embodiment of the present invention for the cabin.
Figure 20:
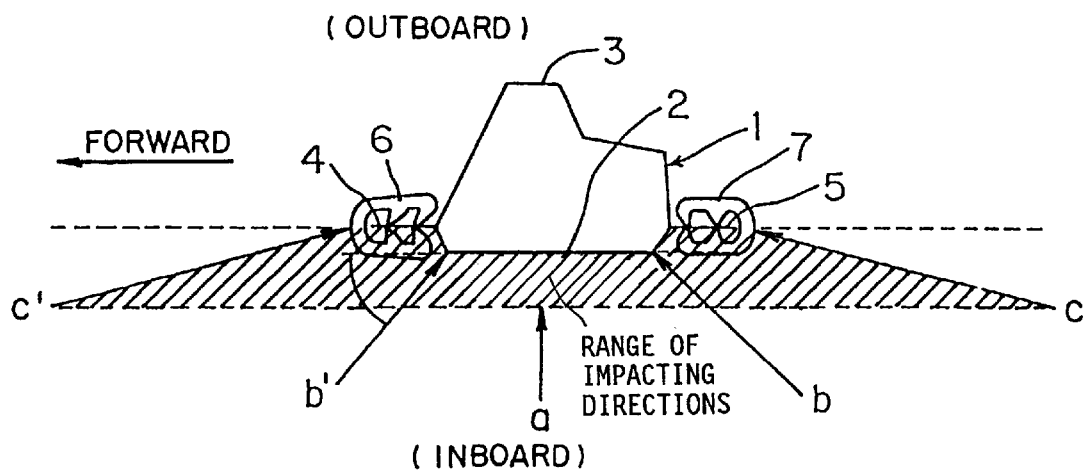
FIG. 20 is a cross-sectional view of a pillar portion, illustrating impact loads which may be taken as targets of an impact energy absorbing structure according to the present invention for a cabin.
Figure 21:
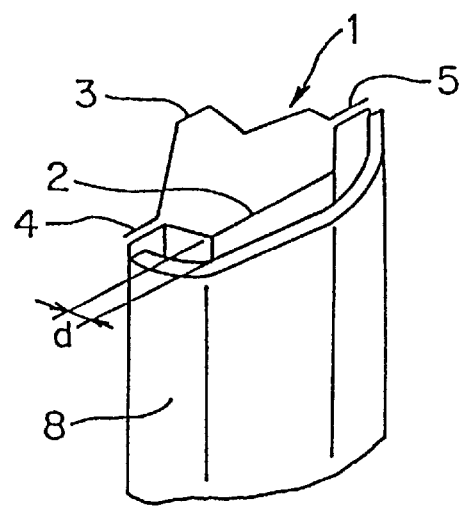
FIG. 21 is a perspective view showing a trim which has heretofore been mounted on a pillar portion.

Referring next to FIG. 17 to FIG. 19, the seventh embodiment of the present invention will be described. As is shown in FIG. 17, the impact energy absorbing structure of this embodiment is also intended for a center pillar but in this embodiment, more specifically for a center pillar equipped at an intended position of impacts with a height adjuster rail for a seat belt anchor (a member of a seat belt system).

The adjuster rail, as illustrated in FIG. 19, is adapted to adjust the height of a seat belt anchor 31 and it is generally arranged at a position which an occupant in a vehicle may hit. The adjuster rail 30 is provided at opposite side portions thereof with walls (side edge wall portions) 32A,32B facing the front and rear of the vehicle, respectively. A slot 33 is formed through the trim 10 at a position facing the adjuster rail 30.

Further, the trim 10 is provided with a front portion 10A and curved side edge portions 10B,10C substantially like the sixth embodiment. Inside the trim 10, impact absorbing ribs 11 are arranged. Further, the trim 10 and the impact absorbing ribs 11 are both made of a resin, and have been formed by monolithic molding.

As is illustrated in FIG. 17 and FIG. 18, the impact absorbing ribs 11 are provided with front ribs 12, which are formed on the back side of the front portion 10A of the trim 10, and also with edge ribs 13 formed on the back sides of the curved side edge portions 10B,10C of the trim 10. The front ribs 12 have been constructed by joining plural vertical ribs 14A,14B, 14C,14D, which are arranged at predetermined intervals so that they extend in the direction of the length of the pillar 1, with plural lateral ribs 15A,15B arranged at predetermined intervals so that they extend in the direction of the width of the pillar 1. By these vertical ribs 14A,14B,14C,14D and lateral ribs 15A,15B, the front rib is formed into a honeycomb structure with rectangular cells arrayed therein.

The plural edge ribs 13 are arranged at predetermined intervals so that they extend in the direction of the width of the pillar 1 in parallel with the lateral ribs 15A,15B. Their side edges 13a are formed up to the end edges 10b,10c of the curved side edge portions 10B,10C of the trim 10. In addition, the free ends 13b are joined to outer surfaces of the vertical ribs 14A,14B, whereby a sort of honeycomb structure with substantially square cells arrayed therein is formed. Here, relatively large rigidity is required for the curved side edge portions 10B,10C of the trim 10 to absorb impacts so that the edge ribs 13 are arranged at a higher density than the lateral ribs 15.

In particular, at positions, which an occupant may hit, namely, on the opposite sides of the adjuster rail 30, the vertical ribs 14A,14B are arranged close to the walls 32A, 32B so that the vertical ribs can come to contact with the walls when impacts are applied at small angles (for example, in the direction c and the direction c').

Incidentally, a recess 10D is formed around the slot 33 in the front portion 10A of the trim 10.

The impact energy absorbing structure according to the seventh embodiment of the present invention for the cabin is constructed as described above. When an impact is applied to the front portion 10A of the trim 10 in the direction a, the lateral ribs 15A,15B and the vertical ribs 14A,14B,14C,14D primarily absorb the impact energy before the front portion 10A of the trim 10 reaches the pillar inner 2 while these ribs undergo buckling deformation and in some instances, destruction under the impact energy. Hence, even when the occupant hits the trim 10 in the direction b, the impact can be damped to a certain level or less to protect the occupant.

When an impact is applied in the direction b' or b, the impact energy is absorbed before the trim 10 reaches the position where the flange portion 4 or 5 of the pillar 1 is exposed, while primarily the edge ribs 13 undergo buckling deformation and in some instances, destruction under the impact energy. Hence, even when the occupant hits the trim 10 in the direction b, the impact can be damped to a certain level or less to protect the occupant.

Especially when an impact is applied in the direction c' or the direction c, the curved side edge portion 10B or 10C of the trim 10 undergoes displacement in addition to deformation and destruction of the ribs 13. In this structure, as indicated by chain lines in connection with the curved side edge portion 10c, the curved side edge portion 10B or 10C can undergo displacement without interference with the corresponding flange portion 4 or 5. Even if there is a collapsed remain 20 of the ribs 13 or the like, the distance (jutting-out width) D1 between the surface of the trim 10 and the end edge of the flange portion 5 can be used in its entirety as an effective energy absorbing stroke S.

As a consequence, this embodiment can obtain similar advantageous effects as the sixth embodiment.

By the way, in each of the embodiments, the ribs 11 are integrally formed with the trim 10. They can however be discrete members. For members like the ribs 11, which are adapted to absorb impact energy from a frontal direction (in the direction a) or from an oblique direction (in the direction b or b'), a metal or the like other than a resin can be used to make use of its elastic deformation or plastic deformation. In combination with such materials, a cushioning material such as rubber or urethane can also be used.

Each of the above-mentioned embodiments is intended for a center pillar. The present structure can be applied for the absorption of impact energy for a cabin wall other than a center pillar and can be applied, for example, to other pillars such as front pillars and rear pillars.

Capability of Exploitation in Industry

As described above, the impact energy absorbing structure according to the present invention for the vehicle cabin makes it possible to absorb impact energy, which is directed toward a structural member, by an impact absorbing member. When an occupant in the cabin is about to hit the structural member, the impact can be damped to protect the occupant. Especially, application of the impact energy absorbing structure of the present invention for the cabin to a pillar, which is one of structural elements of a vehicle and is required to have high rigidity and strength upon constructing a cabin to protect an occupant, can further enhance the occupant protecting effects. In addition, resin-made impact absorbing ribs can be used as the impact absorbing member so that the structure can be formed easily at low cost.

We claim:

1. An impact energy absorbing structure attached to an inner surface of a cabin of an automotive vehicle, comprising:
   a trim member covering the inner surface;
   first impact absorbing ribs, arranged between the inner surface and said trim member, for absorbing impact energy directed from a surface of said trim member toward the inner surface;
   a side edge portion, formed integrally with said trim member in a curved shape for covering an edge portion of the inner surface; and
   a second impact absorbing ribs, provided between said side edge portion and the edge portion of the inner surface, for absorbing impact energy directed from a surface of said side edge portion toward the edge portion of the inner surface,
   wherein at least one of said first and second impact absorbing ribs forms a lattice structure extending in a direction towards the inner surface.

2. The structure according to claim 1, wherein the inner surface is a pillar.

3. The structure according to claim 2, wherein said pillar includes at least one flange portion, and said side edge portion and said second impact absorbing ribs cover said at least one flange portion.

4. The structure according to claim 1, wherein said first impact absorbing ribs are formed integrally with said trim member.

5. The structure according to claim 1, wherein said second impact absorbing ribs are formed integrally with said side edge portion.

6. The structure according to claim 1, wherein said trim member, said side edge portion, and said first and second ribs are made of a resilient material.

7. The structure according to claim 6, wherein said trim member, said side edge portion, and said first and second ribs are made of a resin material.

8. The structure according to claim 1, wherein said lattice structure includes a honeycomb structure extending in a direction substantially perpendicular to said trim member.

9. The structure according to claim 1, wherein said lattice structure includes a plurality of hollow rectangular structure extending in a direction substantially perpendicular to said trim member.

10. An impact energy absorbing structure for a cabin of an automotive vehicle, the cabin including a structural member having an inner member and an outer member joined together at a flange portion at a side portion thereof, the inner member having an inboard front portion, facing the cabin, and an inboard side edge portion formed adjacent to a base of the flange, comprising:
    a trim member, provided with a front portion facing the inboard front portion, and a side edge portion facing the inboard side edge portion, for covering the inboard front portion and the inboard side edge portion of the structural member; and
    edge impact absorbing ribs, arranged between said inboard side edge portion and said side edge portion of said trim member, for absorbing impact energy applied at an angle in a direction from a surface of said side edge portion of said trim member toward a vicinity of said flange portion,
    wherein said edge impact absorbing ribs form a lattice structure extending in a direction towards the inner member.

11. The structure according to claim 10, wherein said structural member is a pillar formed of the inner member and the outer member joined together at flange portion provided on the side portion of the inner and outer members, and
    the front portion of said trim member faces the inboard front portion of the pillar and the side edge portion faces the inboard side edge portion of the pillar, such that said trim member covers an inboard side of the pillar.

12. The structure according to claim 11, wherein the inboard side edge portion is formed on the inner member of the pillar.

13. The structure according to claim 11 or 12, wherein said edge impact absorbing ribs and said trim member are integrally formed with a resin material.

14. The structure according to claim 11, further comprising:
    front impact absorbing ribs arranged between the inboard front portion of the pillar and said front portion of said trim member, such that impact energy applied in an outboard sideway direction to said trim member can be absorbed.

15. The structure according to claim 14, wherein said edge impact absorbing ribs and said front impact absorbing ribs are formed in a honeycomb structure extending in a direction substantially perpendicular to said trim member, and
    said front impact absorbing ribs arranged between the inboard front portion of the pillar and said front portion of said trim member, such that impact energy applied in an outboard sideway direction to said trim member can be absorbed.

16. The structure according to claim 15, wherein said front impact absorbing ribs are formed by connecting plural vertical ribs in a longitudinal direction of said pillar, with plural lateral ribs extending in a lateral direction of said pillar, to form a honeycomb structure.

17. An impact energy absorbing structure for a cabin of an automotive vehicle, the cabin including a pillar having an inner member and an outer member joined together at a flange portion at a side portion thereof, the inner member having an inboard front portion, facing the cabin, and an inboard side edge portion formed adjacent to a base of the flange, comprising:

a trim member, provided with a front portion facing the inboard front portion, and a side edge portion facing the inboard side edge portion, for covering the inboard front portion and the inboard side edge portion of the structural member; and edge impact absorbing ribs, arranged between said inboard side edge portion and said side edge portion of said trim member, for absorbing impact energy applied at an angle in a direction from a surface of said side edge portion of said trim member toward a vicinity of said flange portion, wherein said trim member is constructed, such that a free end of a side edge portion of said trim member is located inboard of said flange portion formed on an edge portion of said pillar.

* * * * *